(12) United States Patent
Minami et al.

(10) Patent No.: US 10,183,690 B2
(45) Date of Patent: Jan. 22, 2019

(54) ROTATION-LINEAR MOTION CONVERSION APPARATUS AND STEERING APPARATUS

(71) Applicant: THK CO., LTD., Tokyo (JP)

(72) Inventors: Toshiro Minami, Tokyo (JP); Yuji Tachikake, Tokyo (JP); Toshihisa Sakamoto, Tokyo (JP); Kazuhiko Akiyama, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/906,207

(22) PCT Filed: Jul. 22, 2014

(86) PCT No.: PCT/JP2014/069338
§ 371 (c)(1),
(2) Date: Jan. 19, 2016

(87) PCT Pub. No.: WO2015/012269
PCT Pub. Date: Jan. 29, 2015

(65) Prior Publication Data
US 2016/0167697 A1    Jun. 16, 2016

(30) Foreign Application Priority Data

Jul. 22, 2013  (JP) ................................. 2013-151794
Feb. 25, 2014  (JP) ................................. 2014-034731

(51) Int. Cl.
*B62D 3/12*    (2006.01)
*F16D 3/06*    (2006.01)
(Continued)

(52) U.S. Cl.
CPC ............ *B62D 3/12* (2013.01); *F16C 29/0642* (2013.01); *F16D 3/06* (2013.01); *F16H 19/04* (2013.01);
(Continued)

(58) Field of Classification Search
CPC .... B62D 3/12; F16C 29/0642; F16C 2326/24; F16D 3/06; F16H 19/04; F16H 25/2204
See application file for complete search history.

(56) References Cited

U.S. PATENT DOCUMENTS

RE28,740 E * 3/1976  Bishop .................... B62D 3/12
                                                    74/422
4,296,641 A * 10/1981  May ...................... B62D 3/123
                                                    384/154
(Continued)

FOREIGN PATENT DOCUMENTS

CN        1260259 A    7/2000
CN        1653278      8/2005
(Continued)

OTHER PUBLICATIONS

International Search Report dated Oct. 28, 2014, issued in counterpart International Application No. PCT/JP2014/069338 (2 pages).
(Continued)

*Primary Examiner* — Zakaria Elahmadi
(74) *Attorney, Agent, or Firm* — Westerman, Hattori, Daniels & Adrian

(57) ABSTRACT

This rotation-linear motion conversion apparatus (10) includes: a pinion shaft (20) in which a pinion gear (22) is formed; a rack bar (30) in which a rack gear (32) that engages with the pinion gear (22) and a support surface (31) along a longitudinal direction are formed; and a support part (40) that supports the rack bar (30) movably along the support surface (31). The support part (40) prevents a movement of the rack bar (30) in a direction X perpendicular to a surface (30*a*) in which the rack gear (32) is formed.

7 Claims, 24 Drawing Sheets

(51) Int. Cl.
    *F16H 19/04*     (2006.01)
    *F16C 29/06*     (2006.01)
    *F16H 25/22*     (2006.01)

(52) U.S. Cl.
    CPC ...... *F16H 25/2204* (2013.01); *F16C 2326/24* (2013.01)

(56) References Cited

U.S. PATENT DOCUMENTS

| | | | | |
|---|---|---|---|---|
| 6,247,375 | B1* | 6/2001 | Gierc | B62D 3/12 |
| | | | | 74/388 PS |
| 8,485,307 | B2* | 7/2013 | Ji | B62D 5/0403 |
| | | | | 180/444 |
| 8,636,099 | B2* | 1/2014 | Kim | B62D 3/02 |
| | | | | 180/444 |
| 2003/0192734 | A1* | 10/2003 | Bugosh | B62D 5/0448 |
| | | | | 180/444 |
| 2009/0203455 | A1* | 8/2009 | Tokioka | B62D 1/16 |
| | | | | 464/167 |
| 2009/0280914 | A1* | 11/2009 | Kakutani | B62D 1/16 |
| | | | | 464/167 |
| 2010/0126300 | A1* | 5/2010 | Tokioka | B62D 1/16 |
| | | | | 74/493 |
| 2010/0319471 | A1* | 12/2010 | Nam | B62D 5/0424 |
| | | | | 74/89.23 |
| 2013/0048411 | A1* | 2/2013 | Lee | B62D 5/0427 |
| | | | | 180/444 |
| 2013/0113173 | A1* | 5/2013 | Bilmayer | B62D 3/126 |
| | | | | 280/93.514 |
| 2013/0161114 | A1* | 6/2013 | Bando | B62D 5/04 |
| | | | | 180/443 |
| 2014/0144263 | A1* | 5/2014 | Yoshioka | B62D 5/0448 |
| | | | | 74/89.23 |
| 2014/0238166 | A1* | 8/2014 | Jeon | B62D 3/08 |
| | | | | 74/89.23 |
| 2015/0151780 | A1* | 6/2015 | Fujita | F16H 25/2219 |
| | | | | 74/424.87 |
| 2015/0239493 | A1* | 8/2015 | Ito | F16H 25/2219 |
| | | | | 180/444 |
| 2015/0274191 | A1* | 10/2015 | Vogler | B62D 3/12 |
| | | | | 280/93.51 |
| 2016/0185378 | A1* | 6/2016 | Kamimura | F16C 3/035 |
| | | | | 74/493 |

FOREIGN PATENT DOCUMENTS

| | | | |
|---|---|---|---|
| CN | 101258066 | A | 9/2008 |
| CN | 102414462 | A | 4/2012 |
| CN | 102892663 | | 1/2013 |
| DE | 10 2009 007 351 | A1 | 10/2009 |
| DE | 10 2010 027 553 | A1 | 1/2012 |
| JP | 2-43519 | U | 3/1990 |
| JP | 3-48149 | U | 5/1991 |
| JP | 3-117756 | A | 5/1991 |
| JP | 09-132151 | A | 5/1997 |
| JP | 3074339 | B2 | 8/2000 |
| JP | 2000-355278 | A | 12/2000 |
| JP | 2001-146171 | A | 5/2001 |
| JP | 2007-162799 | A | 6/2007 |
| JP | 2010-69987 | A | 4/2010 |
| JP | 2011-161985 | A | 8/2011 |
| JP | 2011161985 | A * | 8/2011 |
| JP | 2012-245810 | A | 12/2012 |
| JP | 2013-99987 | A | 5/2013 |
| JP | 2013099987 | A * | 5/2013 |
| WO | 02/36410 | A1 | 5/2002 |

OTHER PUBLICATIONS

Office Action dated Mar. 31, 2017, issued in counterpart Chinese Application No. 201480040997.1, with partial English translation. (9 pages).

Extended (supplementary) European Search Report dated Jul. 25, 2017, issued in counterpart European Application No. 14828719.6. (8 pages).

* cited by examiner

ROTATION-LINEAR MOTION CONVERSION APPARATUS AND STEERING APPARATUS

TECHNICAL FIELD

The present invention relates to a rotation-linear motion conversion apparatus and a steering apparatus.

Priority is claimed on Japanese Patent Application No. 2014-034731, filed on Feb. 25, 2014 and Japanese Patent Application No. 2013-151794, filed on Jul. 22, 2013, the contents of which are incorporated herein by reference.

BACKGROUND

Rack and pinion apparatuses are used in steering apparatuses that arbitrarily change the travel direction of a vehicle.

A rack and pinion apparatus includes a pinion shaft in which a pinion gear is formed and a rack bar in which a rack gear that engages with the pinion gear is formed. The rack and pinion apparatus converts a rotation motion of the pinion shaft into a linear motion of the rack bar by the action between the pinion gear and the rack gear.

When a steering wheel is rotated, the pinion shaft is rotated via a steering shaft. In accordance with the rotation of the pinion shaft, the rack bar is reciprocated in the width direction of the vehicle and changes the direction (travel direction) of a tire (wheel) via a link member.

RELATED ART DOCUMENTS

Patent Documents

[Patent Document 1] Japanese Patent Publication No. 3074339

SUMMARY OF INVENTION

Problem to be Solved by the Invention

The rack bar receives, for example, a strong buckling load when the tire runs on the unevenness of a road. Therefore, in order to increase the bending strength of the rack bar, the rack bar is formed in a cylindrical shape or the like to increase the thickness of the rack bar and enhance a cross-sectional secondary moment.

However, the rack bar is thickened, and a rack cover that covers the rack bar is also enlarged. Thus, there is a possibility that the weight of the apparatus is increased.

Since the pinion shaft is tilted with respect to and crosses with the rack bar, the pinion gear is formed as a helical gear. Therefore, the engagement between the pinion gear and the rack gear becomes a point contact, and a large stress concentrates on the engagement part between the pinion gear and the rack gear. Therefore, in order to enhance the strength of the rack gear, for example, the tooth width of the rack gear is increased.

However, when the tooth width of the rack gear is increased, the width of the rack bar is increased, and there is a possibility that the weight of the apparatus will increase.

Further, since the engagement between the pinion gear and the rack gear is a point contact, or the engagement area is extremely narrow, the variation of a buckling load occurred at the rack bar easily transmits via the pinion shaft to the steering wheel. Therefore, there is a possibility that the driver may have a bad feel of the steering wheel.

The present invention provides a rotation-linear motion conversion apparatus that is capable of reducing the weight of the rack bar.

The present invention provides a steering apparatus that smoothenes the feel transmitted to the steering wheel at the time of traveling.

Means for Solving the Problem

According to a first aspect of the present invention, a rotation-linear motion conversion apparatus includes: a pinion shaft in which a pinion gear is formed; a rack bar in which a rack gear that engages with the pinion gear and a support surface along a longitudinal direction are formed; and a support part that supports the rack bar movably along the support surface.

According to a second aspect of the present invention, in the rotation-linear motion conversion apparatus according to the first aspect, the support part prevents the rack bar from relatively moving in a direction perpendicular to a surface in which the rack gear is formed.

According to a third aspect of the present invention, the rotation-linear motion conversion apparatus according to the first aspect or the second aspect includes a plurality of rolling elements that are provided between the support part and the rack bar and roll on the support surface.

According to a fourth aspect of the present invention, in the rotation-linear motion conversion apparatus according to any one of the first aspect to the third aspect, the pinion gear and the rack gear are each formed as a spur gear, a tooth width direction of the rack gear crosses with respect to a width direction of the rack bar, and a pitch surface of the rack gear is tilted in a thickness direction of the rack bar.

According to a fifth aspect of the present invention, the rotation-linear motion conversion apparatus according to any one of the first aspect to the fourth aspect includes: a second rack gear that is formed on the rack bar; a second pinion gear that engages with the second rack gear; and a rotation drive device that rotates the second pinion gear.

According to a sixth aspect of the present invention, the rotation-linear motion conversion apparatus according to any one of the first aspect to the fourth aspect includes: a spiral ball thread groove that is formed on the rack bar; a ball nut that engages with the ball thread groove; and a rotation drive device that rotates the ball nut.

According to a seventh aspect of the present invention, the rotation-linear motion conversion apparatus according to any one of the first aspect to the sixth aspect includes: a rack cover that covers the outer circumference of the rack bar; a tilt part that is provided on the rack cover and tilts such that the tilt part approaches the rack bar as the tilt part is directed toward the rack bar; and a push part that pushes the support part to the tilt part in a longitudinal direction of the rack bar.

According to an eighth aspect of the present invention, in the rotation-linear motion conversion apparatus according to the seventh aspect, the push part includes a second tilt part that tilts such that the second tilt part approaches the rack bar while the second tilt part is opposed to the rack bar, and the support part is interposed between the tilt part and the second tilt part in the longitudinal direction of the rack bar.

According to a ninth aspect of the present invention, in the rotation-linear motion conversion apparatus according to any one of the first aspect to the eighth aspect, the support part includes a plurality of cam members that are arranged at intervals in a longitudinal direction of the rack bar and comes into contact rotatably with the support surface in the longitudinal direction of the rack bar.

According to a tenth aspect of the present invention, a steering apparatus includes: a steering shaft that is connected to a steering wheel; a link member that is connected to a wheel; and a rotation-linear motion conversion apparatus according to any one of the first aspect to the ninth aspect that converts a rotation of the steering shaft into a linear motion and linearly moves the link member.

According to an eleventh aspect of the present invention, a steering apparatus includes: a steering shaft that is connected to a steering wheel; a link member that is connected to a wheel; a pinion shaft which is connected to the steering shaft and in which a pinion gear is formed; and a rack bar in which a rack gear that engages with the pinion gear is formed and which is connected to the link member, wherein the rack bar is movably supported by a support part along a longitudinal direction and configures a linear guide mechanism.

Advantage of the Invention

According to the rotation-linear motion conversion apparatus and the steering apparatus described above, it is possible to reduce the weight of the rack bar. Accordingly, it is possible to contribute to reducing the weight of the vehicle.

According to the rotation-linear motion conversion apparatus and the steering apparatus described above, it is possible to smoothen the feel transmitted to the steering wheel at the time of traveling.

DESCRIPTION OF THE EMBODIMENTS

Embodiments of the present invention will be described with reference to the drawings.

(First Embodiment)

Figure 1:
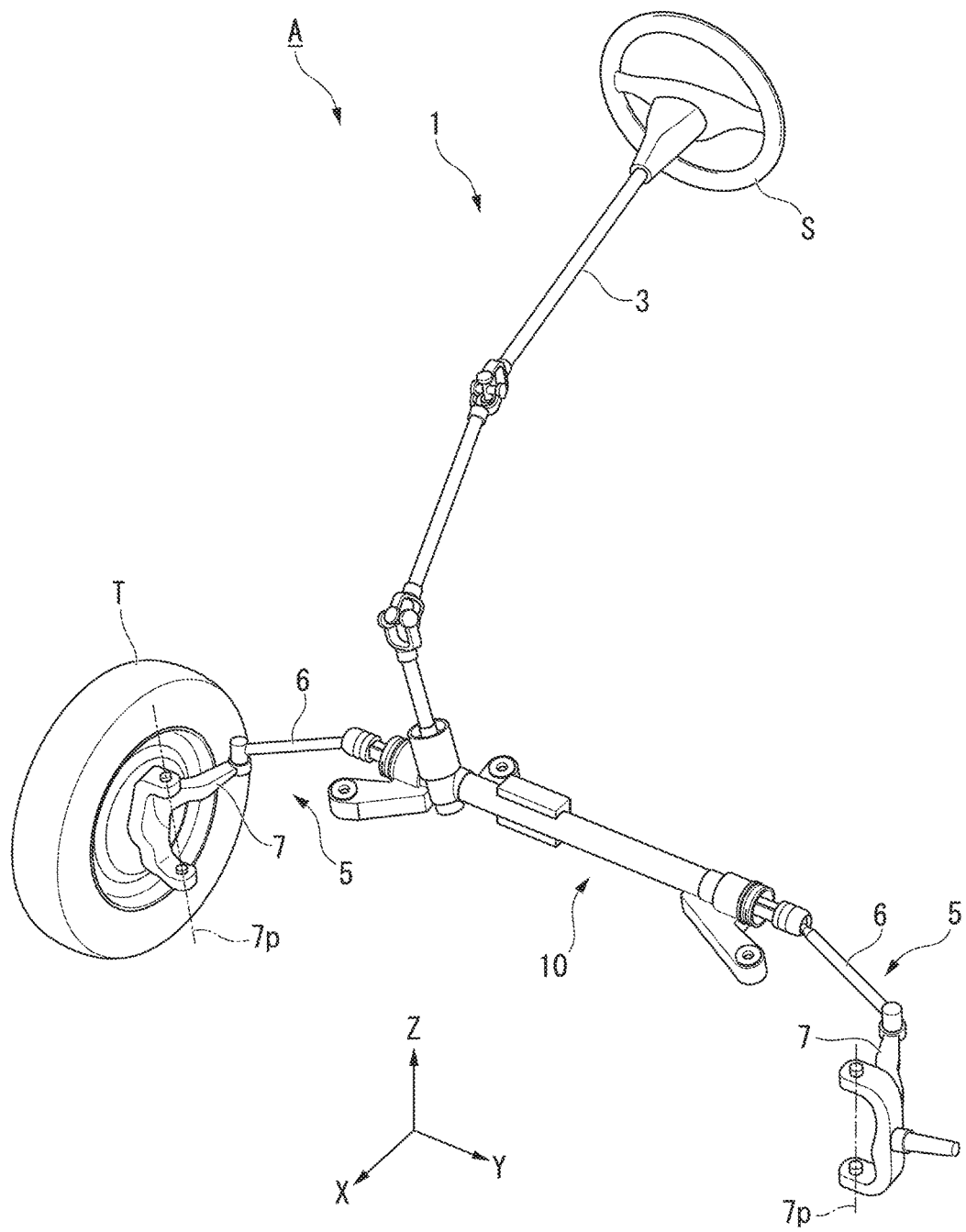
FIG. 1 is a perspective view showing a steering apparatus 1 according to a first embodiment of the present invention.

FIG. 1 is a perspective view showing a steering apparatus 1 according to a first embodiment of the present invention.

Figure 2A:
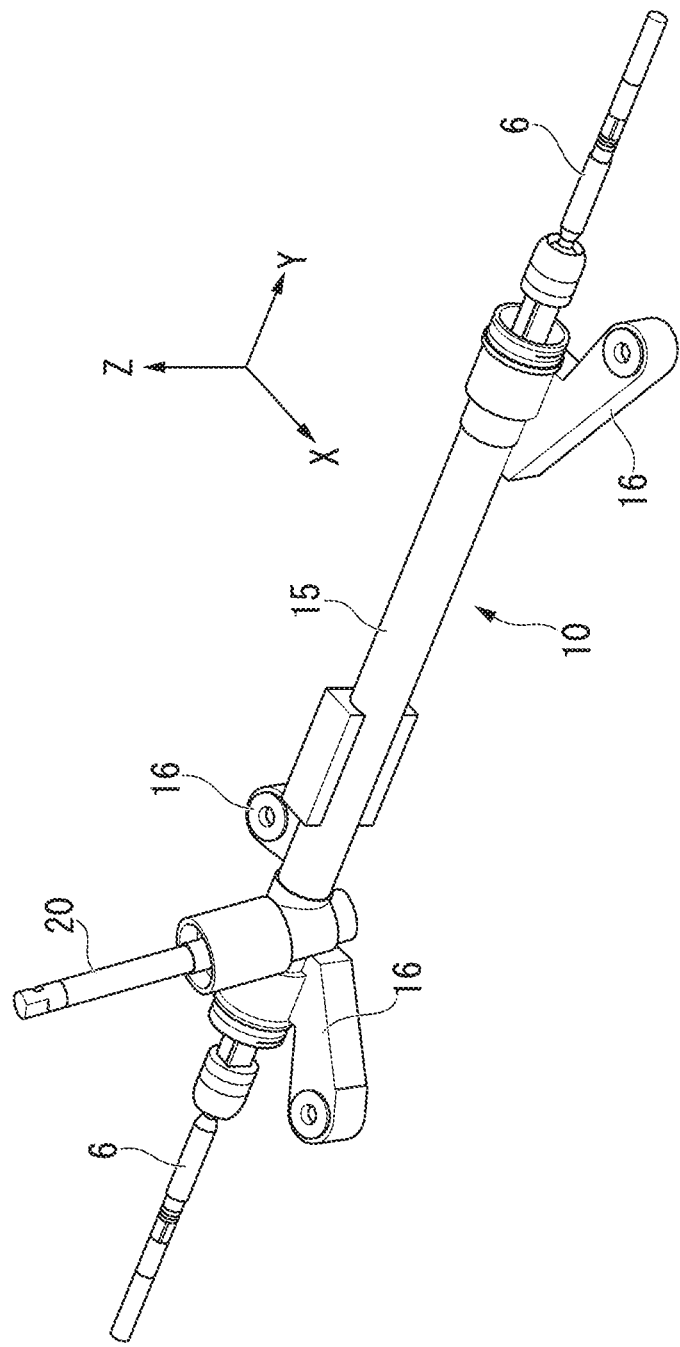
FIG. 2A is a perspective view showing a rack and pinion apparatus 10 and including a rack cover 15 according to the first embodiment of the present invention.
Figure 2B:
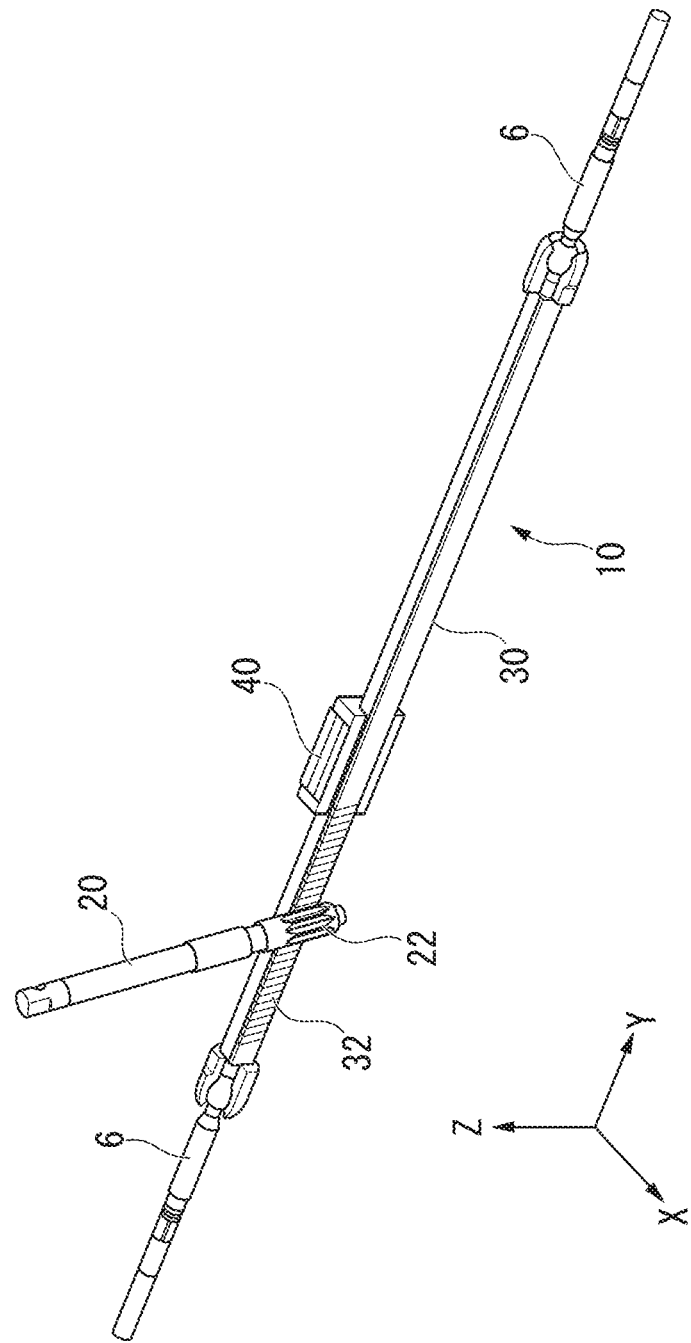
FIG. 2B is a perspective view showing the rack and pinion apparatus 10 and omitting the rack cover 15 according to the first embodiment of the present invention.

FIG. 2A and FIG. 2B are perspective views showing a rack and pinion apparatus 10 according to the first embodiment of the present invention. FIG. 2A is a view including a rack cover 15, and FIG. 2B is a view omitting the rack cover 15.

The front-to-rear direction of a vehicle A is referred to as an X direction, the width direction (right-to-left direction) is referred to as a Y direction, and the vertical direction is referred to as a Z direction.

The forward in the X direction is referred to as the +X direction, and the rearward in the X direction is referred to as the −X direction.

When the vehicle A is seen from the front, the rightward in the Y direction is referred to as the +Y direction, and the leftward in the Y direction is referred to as the −Y direction.

The upward in the Z direction is referred to as the +Z direction, and the downward in the Z direction is referred to as the −Z direction.

The steering apparatus 1 is an apparatus that arbitrarily changes the travel direction of the vehicle A and is connected to a pair of tires (wheels) T as front wheels.

The steering apparatus 1 includes a steering shaft 3, a link member 5, the rack and pinion apparatus 10, and the like.

The steering shaft 3 is a member that is also called as a steering column, and a steering wheel S is connected to the upper end of the steering shaft 3. The lower end of the steering shaft 3 is connected to the rack and pinion apparatus 10 (pinion shaft 20).

The link member 5 includes a tie rod 6, a knuckle arm 7, and the like. The inner end of the tie rod 6 is connected to the rack and pinion apparatus 10 (rack bar 30). The outer end of the tie rod 6 is connected swingably to the inner end of the knuckle arm 7. The outer end of the knuckle arm 7 is connected to the tire T.

The rack and pinion apparatus (rotation-linear motion conversion apparatus) 10 converts a rotation motion of the steering shaft 3 into a linear motion and reciprocates the link member 5 (tie rod 6).

The rack and pinion apparatus 10 includes the pinion shaft 20, the rack bar 30, a support block 40, and the like.

The pinion shaft 20 and the rack bar 30 configure a rack and pinion mechanism (rotation-linear motion conversion mechanism). The rack bar 30 and the support block 40 configure a linear guide mechanism (linear motion guide mechanism).

The rack and pinion apparatus 10 further includes the rack cover 15 that covers the outer circumference of the rack bar 30, a rack cover mount 16 that attaches the rack and pinion apparatus 10 to the vehicle A, and the like. The rack cover mounts 16 are fixed to the rack cover 15 respectively at a plurality of points.

Figure 3:
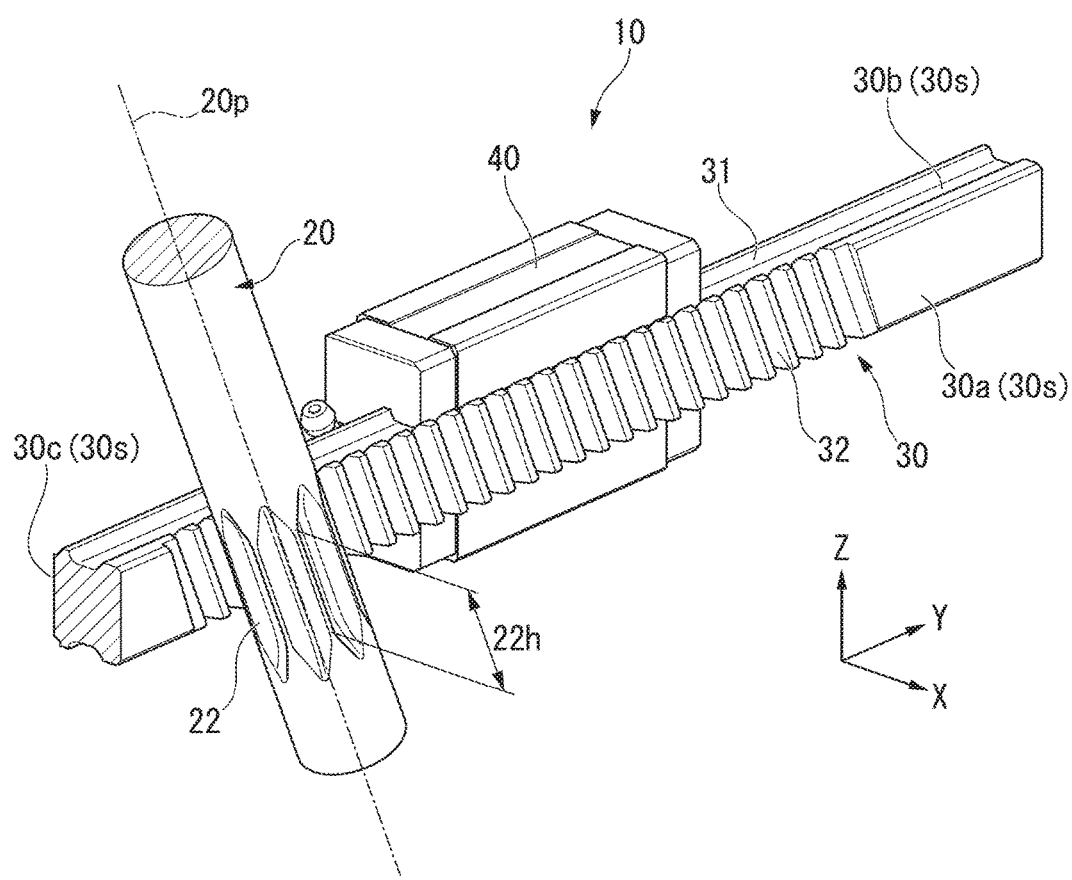
FIG. 3 is an enlarged perspective view showing the rack and pinion apparatus 10.

FIG. 3 is an enlarged perspective view showing the rack and pinion apparatus 10.

Figure 4:
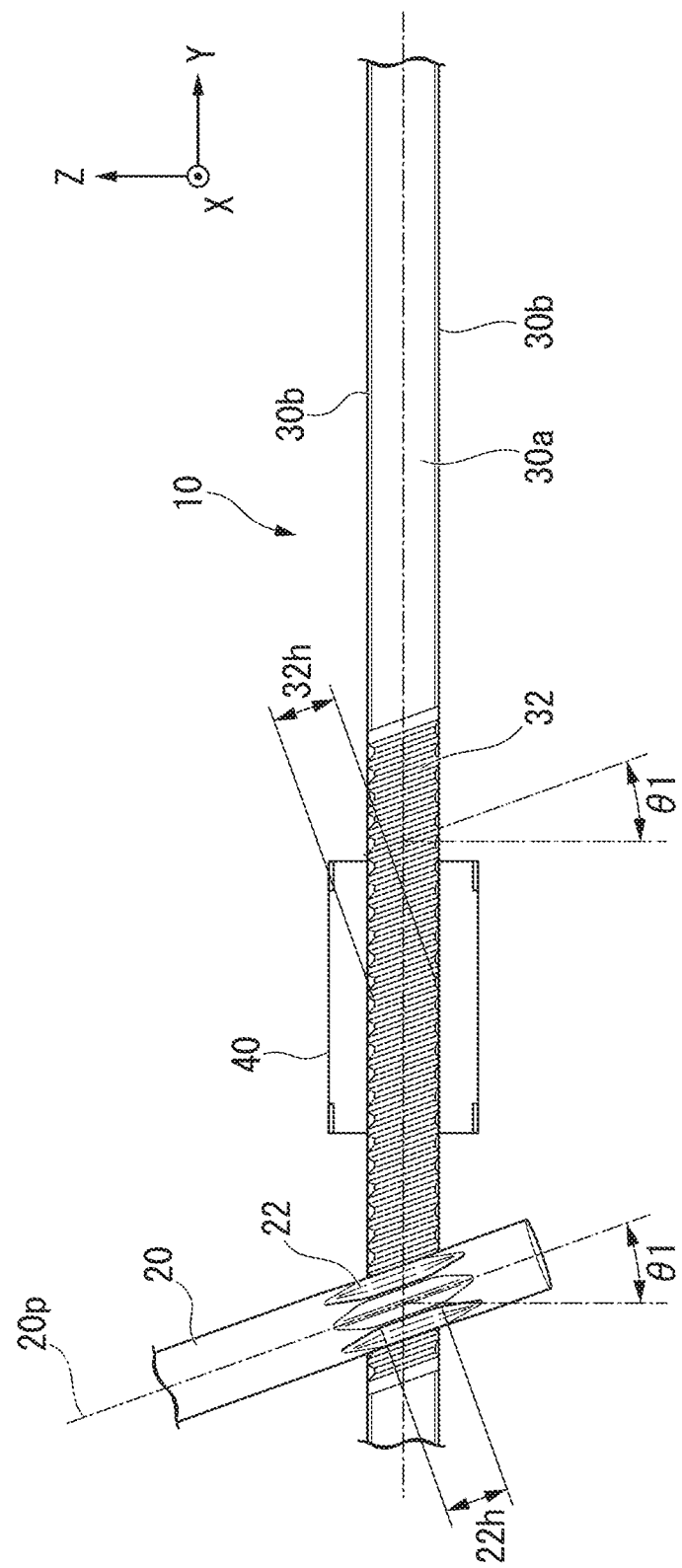
FIG. 4 is a front view of the rack and pinion apparatus 10.

FIG. 4 is a front view of the rack and pinion apparatus 10.

Figure 5A:
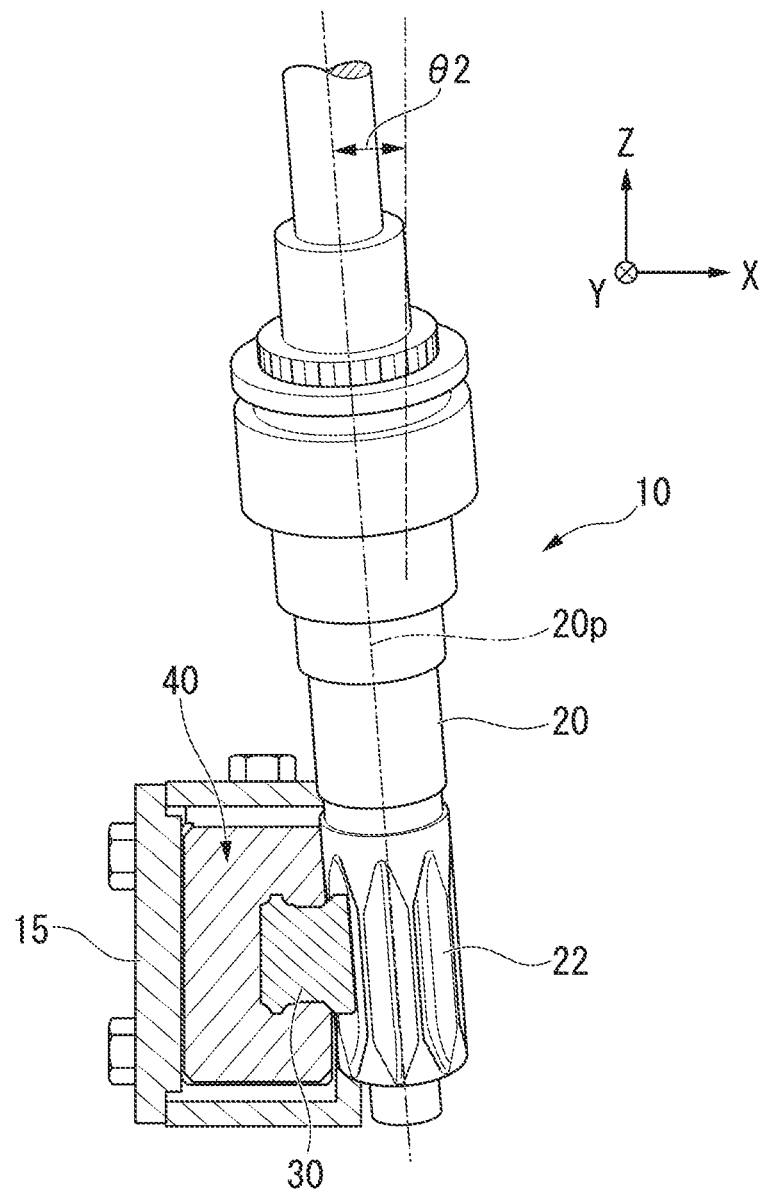
FIG. 5A is a lateral view of the rack and pinion apparatus 10 and shows the rack and pinion apparatus 10.
Figure 5B:
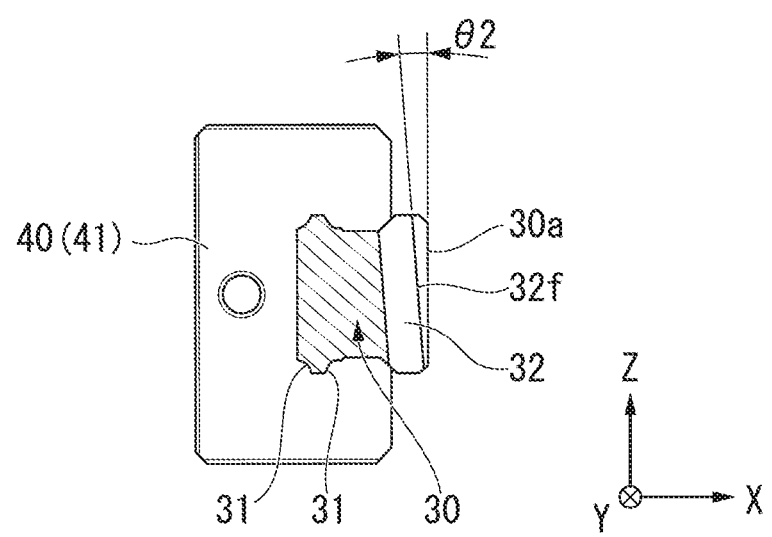
FIG. 5B is a lateral view of the rack and pinion apparatus 10 and shows a support block 40.

FIG. 5A and FIG. 5B are lateral views of the rack and pinion apparatus 10. FIG. 5A shows the rack and pinion apparatus 10, and FIG. 5B shows the support block 40.

The pinion shaft 20 is a member having a columnar shape that extends in the vertical direction and the front-to-rear direction. The upper end of the pinion shaft 20 is connected to the steering shaft 3. A pinion gear 22 is formed on the outer circumferential surface of the lower end part of the pinion shaft 20.

The pinion gear 22 is a spur gear. The pinion gear 22 is formed in parallel with a rotation axis 20$p$ of the pinion shaft 20.

A tooth width 22$h$ of the pinion gear 22 is formed so as to be longer than a tooth width 32$h$ of a rack gear 32 described later.

It is possible to arbitrarily set the dimension, material, thermal treatment, and the like of the pinion shaft 20 (pinion gear 22). It is possible to arbitrarily set the number of teeth, dimension, accuracy, and the like of the pinion gear 22.

The rack bar 30 is a member having a square pole shape that extends in the width direction. The rack gear 32 is formed on the left of the center part of the rack bar 30. Both ends of the rack bar 30 are respectively connected to the tie rods 6.

The rack bar 30 is a member that extends in the right-to-left direction and is formed such that the cross-section perpendicular to the right-to-left direction has a substantially rectangular shape. Both ends of the rack bar 30 are respectively connected to the tie rods 6.

The rack gear 32 is formed on part of a front surface 30$a$ that faces forward (+X direction) of an outer circumferential surface 30$s$ of the rack bar 30. The rack gear 32 is formed at the left region of the center part of the rack bar 30 (in a case of the vehicle A of a right-handle drive specification).

The rack gear 32 is a spur gear, and a plurality of teeth are arranged along the longitudinal direction (Y direction) of the rack bar 30. The rack gear 32 engages with the pinion gear 22 of the pinion shaft 20.

The tooth width 32$h$ direction of the rack gear 32 crosses at a predetermined angle with respect to the width direction (Z direction) of the rack bar 30. Further, a pitch surface 32$f$ of the rack gear 32 crosses at a predetermined angle θ2 with respect to the front surface 30$a$ of the rack bar 30. In other words, the pitch surface 32$f$ is tilted in the thickness direction (X direction) of the rack bar 30.

As shown in FIG. 4, FIG. 5A, and FIG. 5B, in the rack and pinion apparatus 10, the pinion shaft 20 and the rack bar 30 are arranged to be tilted respectively in the XZ plane and the YZ plane and cross with each other. Therefore, the rack gear 32 is formed such that the tooth width direction crosses at a predetermined angle θ1 with respect to the Z direction and the pitch surface 32$f$ is tilted at the predetermined angle θ2 in the X direction.

It is possible to arbitrarily set the dimension, material, thermal treatment, and the like of the rack bar 30 (rack gear 32). It is possible to arbitrarily set the number of teeth, dimension, accuracy, and the like of the rack gear 32, similarly to the pinion gear 22.

For example, a linear guide can be used as the support block 40. The support block 40 is arranged on the rearward side (−X direction) of the rack bar 30 and supports the rack bar 30 movably in the right-to-left direction (Y direction). The support block 40 prevents a relative movement (displacement) in the front-to-rear direction (X direction) of the rack bar 30. The support block 40 also prevents the movement and rotation (displacement and swing) in the vertical direction (Z direction), around the X direction, around the Y direction, and around the Z direction of the rack bar 30.

A plurality of balls 50 are accommodated inside the support block 40. The plurality of balls 50 are interposed between the rack bar 30 and the support block 40, and thereby the rack bar 30 can smoothly reciprocate with respect to the support block 40.

Figure 6:
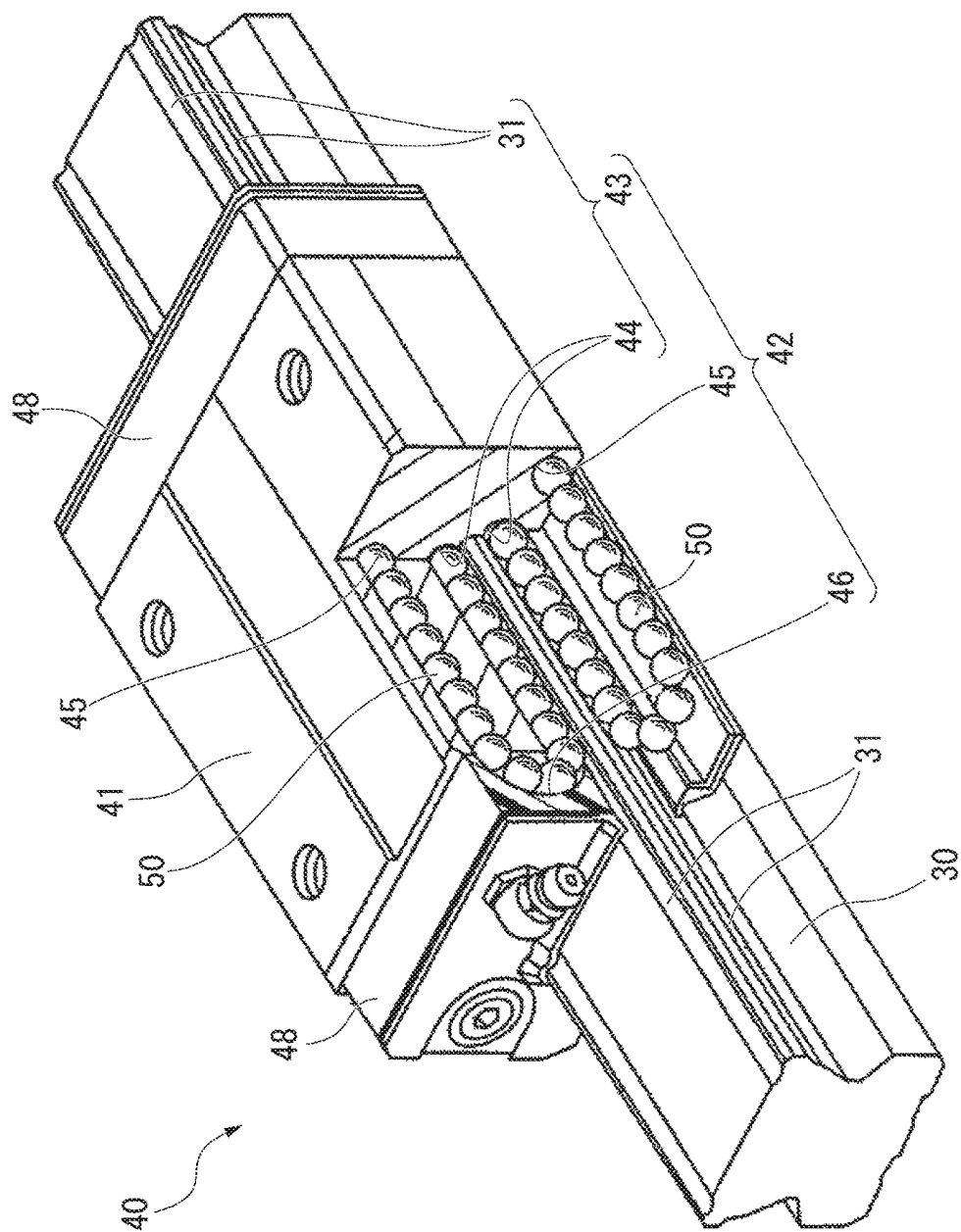
FIG. 6 is a perspective partial cross-sectional view showing a detailed configuration of a rack bar 30 and the support block 40.

FIG. 6 is a perspective partial cross-sectional view showing a detailed configuration of a rack bar 30 and the support block 40.

Ball roll grooves 31 along the longitudinal direction (Y direction) are formed respectively on a pair of lateral surfaces 30$b$ that face the vertical direction (Z direction) of the outer circumferential surface 30$s$ of the rack bar 30. The ball roll groove 31 is a section (surface) on which the plurality of balls 50 roll.

The ball roll groove (support surface) 31 is formed on not only the lateral surface 30$b$ of the rack bar 30 but also a rear surface 30$c$ of the rack bar 30. Four ball roll grooves 31 are provided on the rack bar 30.

The cross-sectional shape of the ball roll groove 31 is a circular arc groove shape configured by a single arc having a radius that is slightly larger than a radius of the ball 50 or a Gothic arch groove shape configured by two arcs.

The support block (support part) 40 includes a main body 41 formed in a saddle shape that bridges the rack bar 30 and cover bodies 48 that are attached respectively to both end surfaces in the longitudinal direction of the main body 41.

A load ball roll groove 44 that is opposed to the ball roll groove 31 of the rack bar 30 is formed in the support block 40. A boundless cyclic path 42 including the load ball roll groove 44 is formed in the support block 40. Four boundless cyclic paths 42 are formed in the support block 40.

The boundless cyclic path 42 is configured by a load ball roll path 43, a ball return path 45, and a pair of direction change paths 46.

The load ball roll path 43 is formed by the load ball roll groove 44 and the ball roll groove 31.

The ball return path 45 extends in parallel with the load ball roll groove 44. The direction change path 46 is formed in a U shape that connects the load ball roll path 43 and the ball return path 45. The direction change path 46 is formed in the cover body 48.

The boundless cyclic path 42 accommodates and arranges the plurality of balls 50.

When the rack bar 30 is moved with respect to the support block 40, the plurality of balls 50 interposed between the ball roll groove 31 of the rack bar 30 and the load ball roll groove 44 of the support block 40 (load ball roll path 43) roll.

The plurality of balls (rolling elements) 50 roll to one end of the load ball roll path 43 and is guided to the direction change path 46. Further, after the plurality of balls 50 pass through the ball return path 45 and the direction change path 46, the plurality of balls 50 return to the load ball roll path 43.

The plurality of balls 50 are interposed between the rack bar 30 and the support block 40, and thereby the resistance when the rack bar 30 is moved in the longitudinal direction with respect to the support block 40 is reduced.

By forming the ball roll groove 31 on the rear surface 30c of the rack bar 30 and supporting the rack bar 30 by the support block 40, the movement (displacement) in the X direction of the rack bar 30 is prevented. In other words, an apparent rigidity in the X direction of the rack bar 30 is enhanced compared to a conventional one.

The support block 40 also prevents the movement and rotation (displacement and swing) in the vertical direction (Z direction), around the X direction (axis), around the Y direction, and around the Z direction of the rack bar 30. The apparent rigidity in the Z direction, around the X direction, around the Y direction, and around the Z direction of the rack bar 30 is also enhanced.

The steering apparatus 1 operates as shown below.

When the steering wheel S is rotated, the pinion shaft 20 rotates via the steering shaft 3.

Since the pinion gear 22 of the pinion shaft 20 engages with the rack gear 32 of the rack bar 30, the rack bar 30 reciprocates in the width direction of the vehicle A in accordance with the rotation of the pinion shaft 20. The rotation of the pinion shaft 20 is converted into a linear motion of the rack bar 30.

The reciprocation of the rack bar 30 is transmitted to the link members 5 respectively connected to both ends of the rack bar 30. The tie rod 6 is pushed and pulled (reciprocated) in the width direction of the vehicle A by the rack bar 30. The knuckle arm 7 interlocks with this push and pull to swing around a vertical axis 7p. Therefore, the tire T connected to the knuckle arm 7 also swings around the vertical axis 7p of the knuckle arm 7.

In this way, the direction (travel direction) of the tire T is changed (refer to FIG. 1).

When the tire T runs on the unevenness of a road, the direction of the tire T is instantaneously varied. Therefore, for example, a strong buckling load acts on the rack bar 30 and causes the rack bar 30 to be deformed.

Therefore, a sufficient strength against a strong buckling load must be secured for the rack bar 30.

Figure 7:
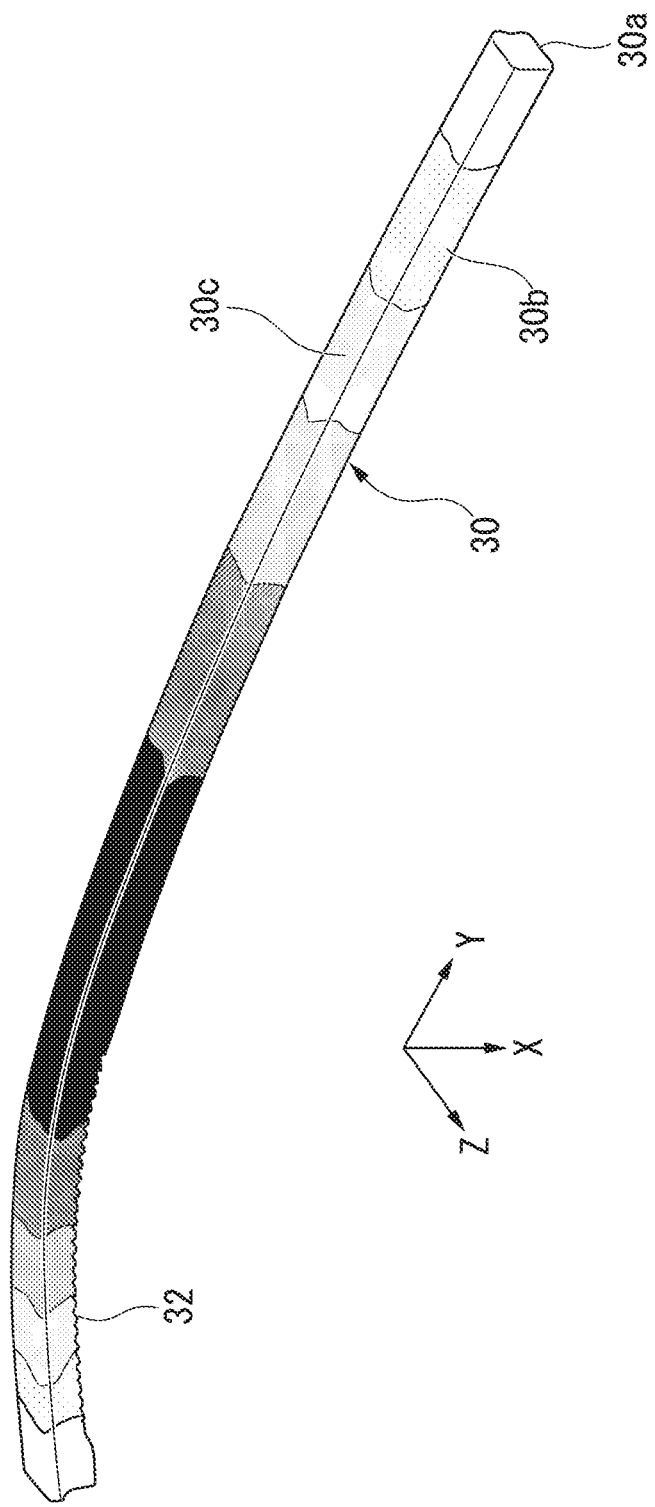
FIG. 7 is a simulation view showing a deformation state of the rack bar 30.

FIG. 7 is a simulation view showing a deformation state of the rack bar 30. The light and shade of color represents the strength of stress. A deep color represents a strong stress.

Since the tire T swings around the vertical axis 7p of the knuckle arm 7, for example, a buckling load that acts on the rack bar 30 works in the horizontal plane (XY plane). Therefore, when the rack bar 30 receives a buckling load, the rack bar 30 is easily bent in the horizontal plane (XY plane) and is not easily bent in the vertical plane (YZ plane).

Accordingly, it is necessary to increase the bending rigidity in the horizontal plane (XY plane) of the rack bar 30.

As shown in FIG. 7, the rack bar 30 is greatly bent in the vicinity of a region in which the rack gear 32 is formed in the longitudinal direction (Y direction) of the rack bar 30. Therefore, it is necessary to increase the bending rigidity of the rack bar 30 in a region including the region in which the rack gear 32 is formed.

In the steering apparatus 1, the support block 40 that supports the rack bar 30 is arranged rearward (−X direction) of the rack bar 30. The support block 40 supports the rack bar 30 smoothly movably in the right-to-left direction (Y direction). At the same time, the support block 40 prevents the movement (displacement) in the front-to-rear direction (X direction) of the rack bar 30. Therefore, an apparent rigidity in the X direction of the rack bar 30 is enhanced.

The support block 40 also prevents the movement and rotation (displacement and swing) in the vertical direction (Z direction), around the X direction, around the Y direction, and around the Z direction of the rack bar 30.

Further, the support block 40 supports a region including the region in which the rack gear 32 is formed in the longitudinal direction (Y direction) of the rack bar 30. When the rack bar 30 reciprocates in the right-to-left direction, there may be a case in which the support block 40 supports the region in which the rack gear 32 is formed. Therefore, even when the rack bar 30 reciprocates in the right-to-left direction, the rack bar 30 is always supported by the support block 40 and is hardly bent.

Accordingly, the size and the weight of the rack bar 30 are reduced in the thickness direction (X direction) compared to a conventional one.

Further, in the steering apparatus 1, the pinion gear 22 is a spur gear and comes into line contact with the rack gear 32. Therefore, when the tooth width of the rack gear 32 is made small, the strength of the rack gear 32 can be secured.

Accordingly, the size and the weight of the rack bar 30 can be reduced in the tooth width direction (Z direction) compared to a conventional one.

The tooth width direction of the rack gear 32 crosses with respect to the width direction of the rack bar 30, and the pitch surface 32f of the rack gear 32 is tilted in the thickness direction of the rack bar 30. Since the pinion gear 22 and the rack gear 32 are both spur gears to therefore be parallel with each other, come into line contact or plane contact with each other, and engage with each other, and the engagement region is greater than a conventional one. Therefore, when the pinion gear 22 rotates and the rack gear 32 moves, the pinion gear 22 engages with the rack gear 32 while sliding in the tooth width direction with respect to the rack gear 32. When the pinion gear 22 slides with respect to the rack gear 32, friction occurs.

Accordingly, for example, when a buckling load that acts on the rack bar 30 or the like is varied, the load is attenuated due to the friction between the pinion gear 22 and the rack gear 32. Therefore, the variation of the buckling load or the like is not easily transmitted via the pinion shaft 20 to the steering wheel S. Therefore, the driver may have a good feel of the steering wheel.

(Second Embodiment)

Next, a second embodiment of the present invention will be described. In the following description, configuration parts identical or similar to those of the embodiment described above are represented by the same reference numerals, and descriptions thereof will be simplified or omitted.

Figure 8:
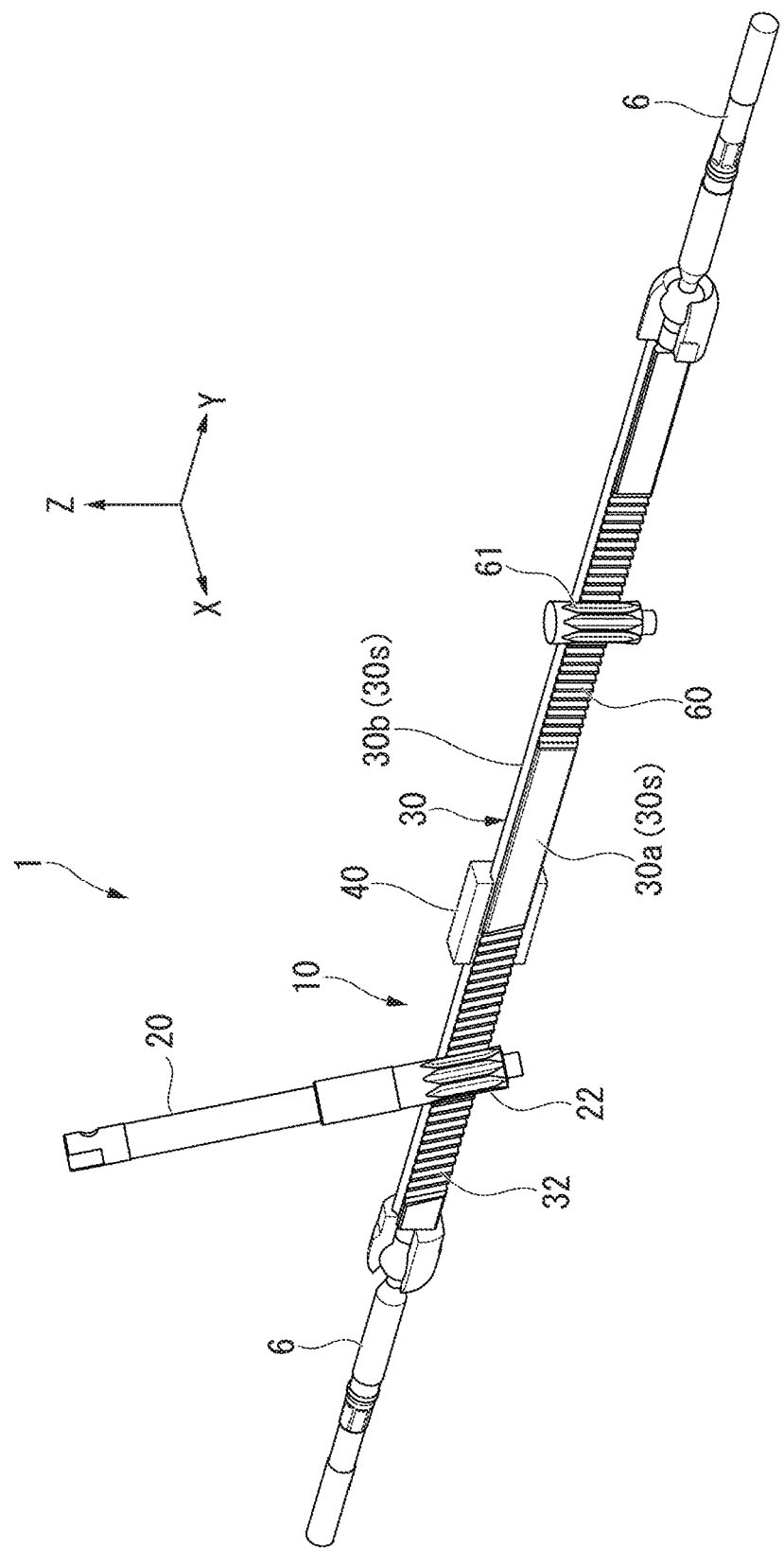
FIG. 8 is a perspective view showing a steering apparatus 1 according to a second embodiment of the present invention.
Figure 9:
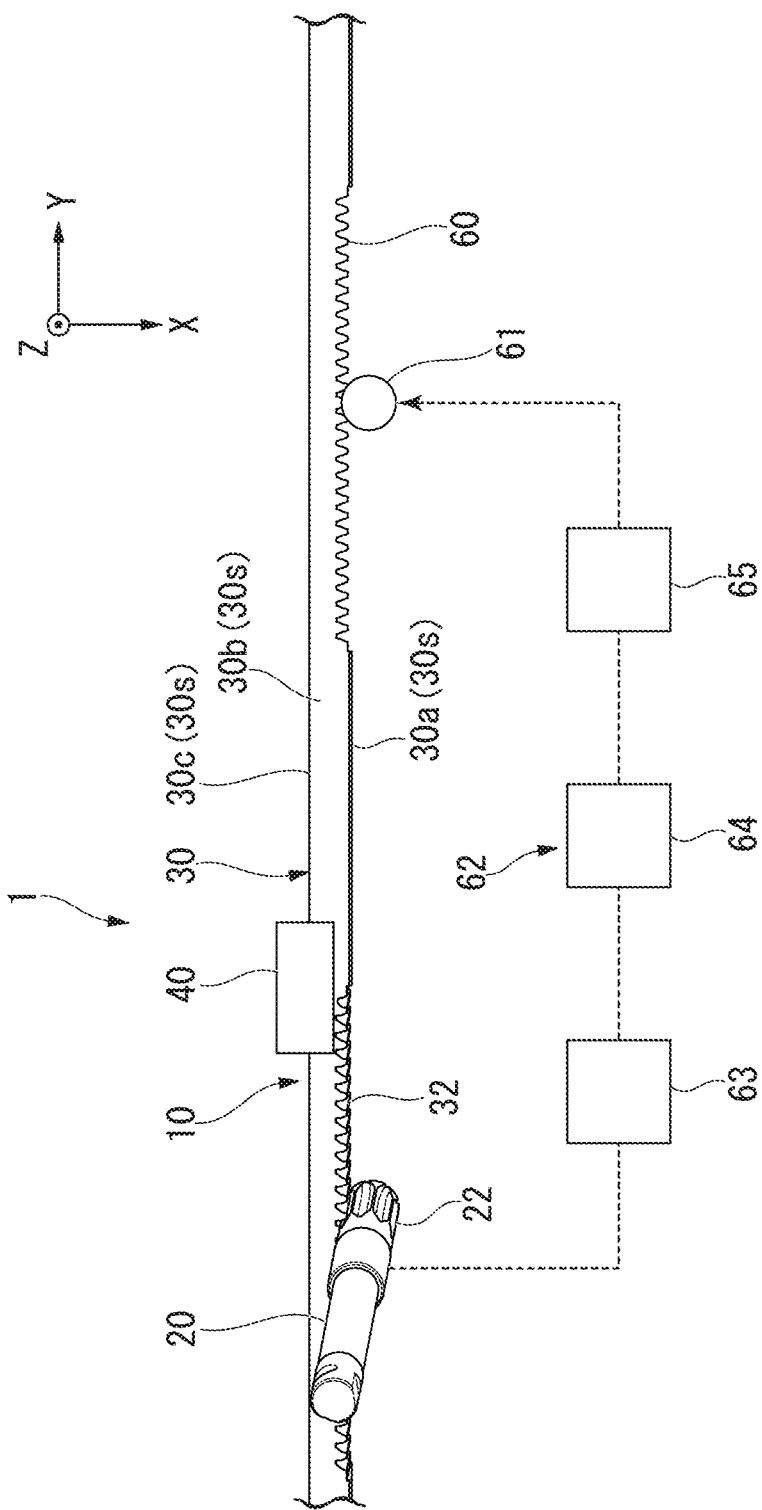
FIG. 9 is a planar configuration view showing the steering apparatus 1 according to the second embodiment of the present invention.

FIG. 8 is a perspective view showing a steering apparatus 1 according to the second embodiment of the present invention. FIG. 9 is a planar configuration view showing the steering apparatus 1 according to the second embodiment of the present invention. Note that, in FIG. 8 and FIG. 9, the rack cover 15 and the like are omitted.

In the steering apparatus 1 of the second embodiment, the configuration of the rack and pinion apparatus 10 is different from that of the embodiment described above.

The rack and pinion apparatus 10 of the second embodiment includes a second rack gear 60, a second pinion gear 61, a rotation drive device 62, and the like.

As shown in FIG. 8, the second rack gear 60 is formed in the rack bar 30 in addition to the rack gear 32. The second rack gear 60 is formed on part of the front surface 30*a* that faces forward (+X direction) of the outer circumferential surface 30*s* of the rack bar 30. The second rack gear 60 is formed at the right region of the center part of the rack bar 30 (in a case of the vehicle A of a right-handle drive specification). The second rack gear 60 is, for example, a spur gear, and a plurality of teeth are arranged along the longitudinal direction (Y direction) of the rack bar 30. It is possible to arbitrarily set the number of teeth, dimension, accuracy, and the like of the second rack gear 60.

The second pinion gear 61 engages with the second rack gear 60. The second pinion gear 61 is a spur gear. The tooth width of the second pinion gear 61 is formed so as to be larger than a tooth width of the second rack gear 60. It is possible to arbitrarily set the number of teeth, dimension, accuracy, and the like of the second pinion gear 61.

The rotation drive device 62 rotates the second pinion gear 61. As shown in FIG. 9, the rotation drive device 62 includes a torque sensor 63, a motor device 64, a speed reducer 65, and the like. The torque sensor 63 detects a torque that acts on the pinion shaft 20. The motor device 64 includes a control unit that is electrically connected to the torque sensor 63, a motor that is driven under the control of the control unit, and the like. The speed reducer 65 includes a worm gear that is connected to the rotation shaft of the motor, a worm wheel that is connected to the second pinion gear 61 and engages with the worm gear, and the like.

In the rotation drive device 62, when a torque of the pinion shaft 20 associated with a steering operation is input to the torque sensor 63, the control unit of the motor device 64 generates a drive signal that corresponds to the detected torque and drives the motor. When the motor is driven, the second pinion gear 61 rotates via the speed reducer 65, and the rack bar 30 in which the second rack gear 60 that engages with the second pinion gear 61 is formed moves in the longitudinal direction, to assist the steering operation. Note that, although the rotation drive device 62 stops the motor when a torque input to the torque sensor 63 becomes zero, the rotation drive device 62 mainly continues the assist operation by the motor while a torque is input.

As described above, the second embodiment adopts a configuration that includes the second rack gear 60 formed in the rack bar 30, the second pinion gear 61 that engages with the second rack gear 60, and the rotation drive device 62 that rotates the second pinion gear. According to this configuration, the support block 40 can receive a load that acts on the rack bar 30 when the second pinion gear 61 rotates. The support block 40 supports the rack bar 30 at a predetermined range in the longitudinal direction and can hold the rack bar 30. Therefore, even when the load acts on the support block 40, it is possible to maintain the engagement between the pinion gear 22 and the rack gear 32 in an appropriate state. Therefore, according to the second embodiment, an ideal motor assist control can be realized while preventing gear rattle between the pinion gear 22 and the rack gear 32 or occurrence of vibration.

(Third Embodiment)

Next, a third embodiment of the present invention will be described. In the following description, configuration parts identical or similar to those of the embodiments described above are represented by the same reference numerals, and descriptions thereof will be simplified or omitted.

Figure 10:
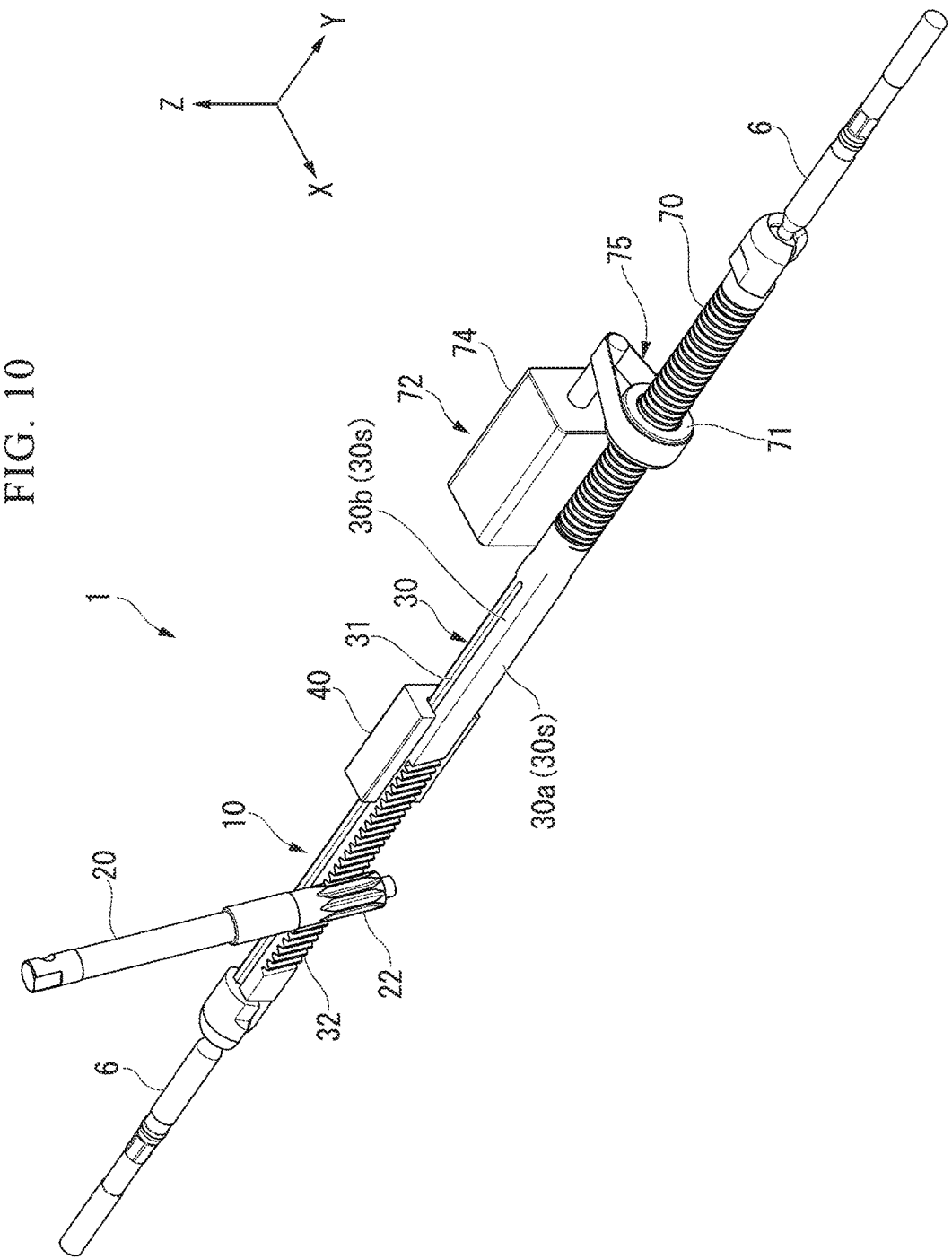
FIG. 10 is a perspective view showing a steering apparatus 1 according to a third embodiment of the present invention.
Figure 11:
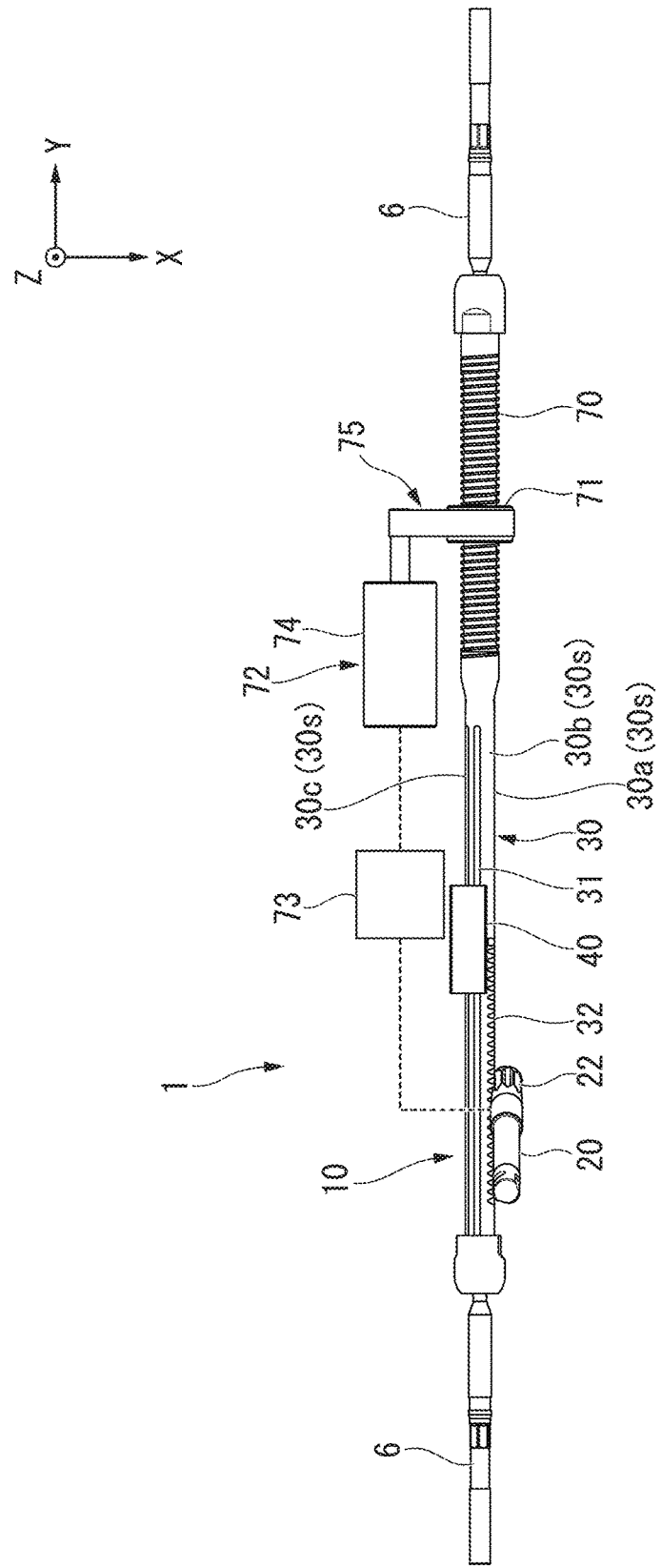
FIG. 11 is a planar configuration view showing the steering apparatus 1 according to the third embodiment of the present invention.

FIG. 10 is a perspective view showing a steering apparatus 1 according to a third embodiment of the present invention. FIG. 11 is a planar configuration view showing the steering apparatus 1 according to the third embodiment of the present invention. Note that, in FIG. 10 and FIG. 11, the rack cover 15 and the like are omitted.

In the steering apparatus 1 of the third embodiment, the configuration of the rack and pinion apparatus 10 is different from those of the embodiments described above.

The rack and pinion apparatus 10 of the third embodiment includes a ball thread groove 70, a ball nut 71, a rotation drive device 72, and the like.

As shown in FIG. 10, the ball thread groove 70 is formed in the rack bar 30 in addition to the rack gear 32. The ball thread groove 70 is formed in a spiral manner on the outer circumferential surface 30*s* of the rack bar 30. The rack bar 30 of the third embodiment is formed such that the cross-section of the region in which the ball thread groove 70 is formed has a substantially circular shape. The ball thread groove 70 is formed at the right region of the center part of the rack bar 30 (in a case of the vehicle A of a right-handle drive specification). It is possible to arbitrarily set the pitch, dimension, accuracy, and the like of the ball thread groove 70.

The ball nut 71 engages with the ball thread groove 70. The ball nut 71 is configured such that the ball nut 71 engages with the ball thread groove 70 and thereby a ball load roll groove (not shown) that is formed inside the ball nut 71 is opposed to the ball thread groove 70 to thereby form a ball load roll path to roll a large number of balls on the ball load roll path. The ball nut 71 includes a ball cyclic path (not shown) to circulate, on the ball road roll groove again, a ball that finishes rolling on the ball load roll groove, and the ball is infinitely circulated from the ball cyclic path to the ball load roll path in accordance with a rotation relative to the rack bar 30. It is possible to arbitrarily set the pitch, dimension, accuracy, and the like of the ball load roll groove and the like of the ball nut 71.

The rotation drive device 72 rotates the ball nut 71. As shown in FIG. 11, the rotation drive device 72 includes a torque sensor 73, a motor device 74, a belt pulley mechanism 75, and the like. The torque sensor 73 detects a torque that acts on the pinion shaft 20. The motor device 74 includes a control unit that is electrically connected to the torque sensor 73, a motor that is driven under the control of the control unit, and the like. The belt pulley mechanism 75 includes pulleys (not shown) that are fixed respectively on a rotation shaft of the motor and the ball nut 71, a belt that is installed to connect the pulleys, and the like.

In the rotation drive device 72, when a torque of the pinion shaft 20 associated with a steering operation is input to the torque sensor 73, the control unit of the motor device 74 generates a drive signal that corresponds to the detected torque and drives the motor. When the motor is driven, the ball nut 71 rotates via the belt pulley mechanism 75, and the rack bar 30 in which the ball thread groove 70 that engages with the ball nut 71 is formed moves in the longitudinal direction, to assist the steering operation. Note that, although the rotation drive device 72 stops the motor when a torque input to the torque sensor 73 becomes zero, the rotation drive device 72 mainly continues the assist operation by the motor while a torque is input.

As described above, the third embodiment adopts a configuration that includes the spiral ball thread groove 70 that is formed on the rack bar 30, the ball nut 71 that engages with the ball thread groove 70, and the rotation drive device 72 that rotates the ball nut 71. According to this configuration, the support block 40 can receive a load that acts on the rack bar 30 when the ball nut 71 rotates.

The support block 40 supports the rack bar 30 at a predetermined range in the longitudinal direction and can hold the rack bar 30. Therefore, even when the load acts on the support block 40, it is possible to maintain the engagement between the pinion gear 22 and the rack gear 32 in an appropriate state. Therefore, according to the third embodiment, an ideal motor assist control can be realized while preventing gear rattle between the pinion gear 22 and the rack gear 32 or occurrence of vibration.

Further, according to the third embodiment, the motor device 74 is arranged in parallel with the rack bar 30 and is connected to the ball nut 71 by the belt pulley mechanism 75, and the speed can be reduced by the belt pulley mechanism 75. Therefore, it is possible to make the configuration of the rotation drive device 72 compact in comparison with the second embodiment described above, and it is possible to reduce the size of the whole steering apparatus 1.

Further, the third embodiment can also adopt the following modified example.

For example, a configuration can be adopted in which the rotation shaft of the motor device 74 is a hollow shaft, the rack bar 30 is inserted into the hollow shaft, and in the state, the hollow shaft is connected to the ball nut 71. According to this configuration, when the hollow shaft of the motor device 74 is rotated, the ball nut 71 rotates, and the rack bar 30 can be moved in the longitudinal direction via the ball. Further, according to this configuration, it is possible to arrange, in a circular manner around the rack bar 30, coils for rotating the hollow shaft of the motor device 74 and arrange the motor device 74 in series with the rack bar 30 (arrange in a skewer manner). Therefore, it is possible to make the configuration of the rotation drive device 72 further compact, and it is possible to reduce the size of the whole steering apparatus 1.

(Fourth Embodiment)

Next, a fourth embodiment of the present invention will be described. In the following description, configuration parts identical or similar to those of the embodiments described above are represented by the same reference numerals, and descriptions thereof will be simplified or omitted.

Figure 12:
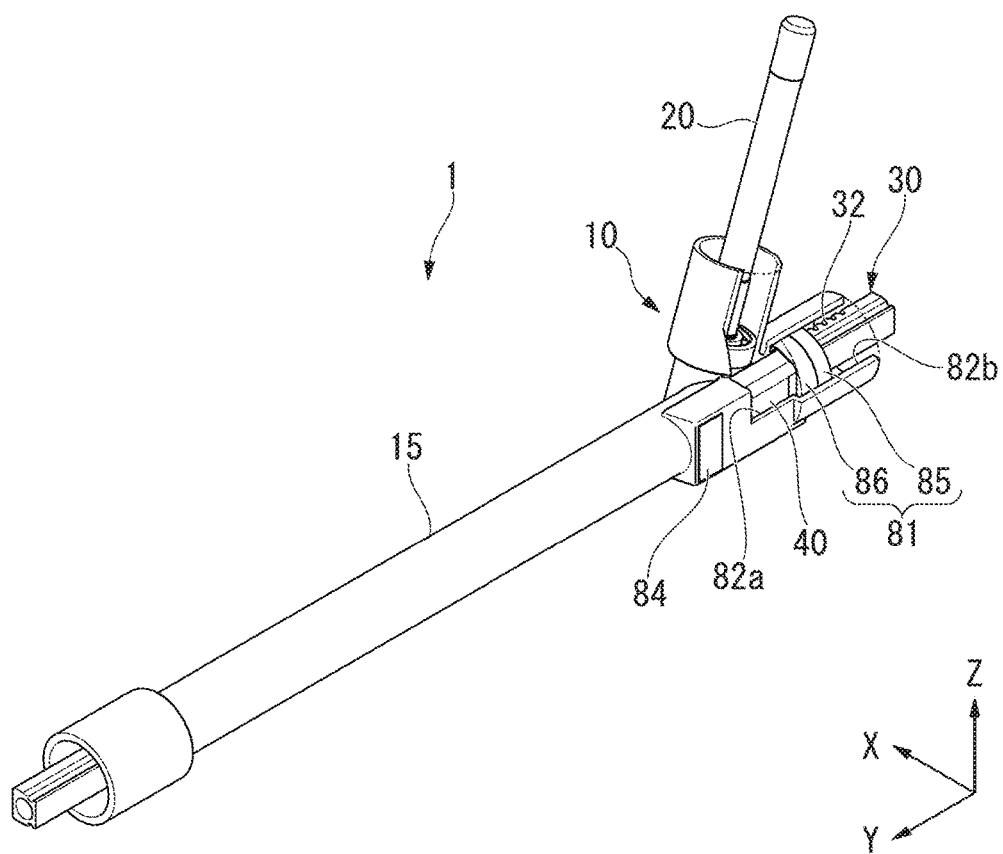
FIG. 12 is a perspective view showing a steering apparatus 1 according to a fourth embodiment of the present invention.
Figure 13:
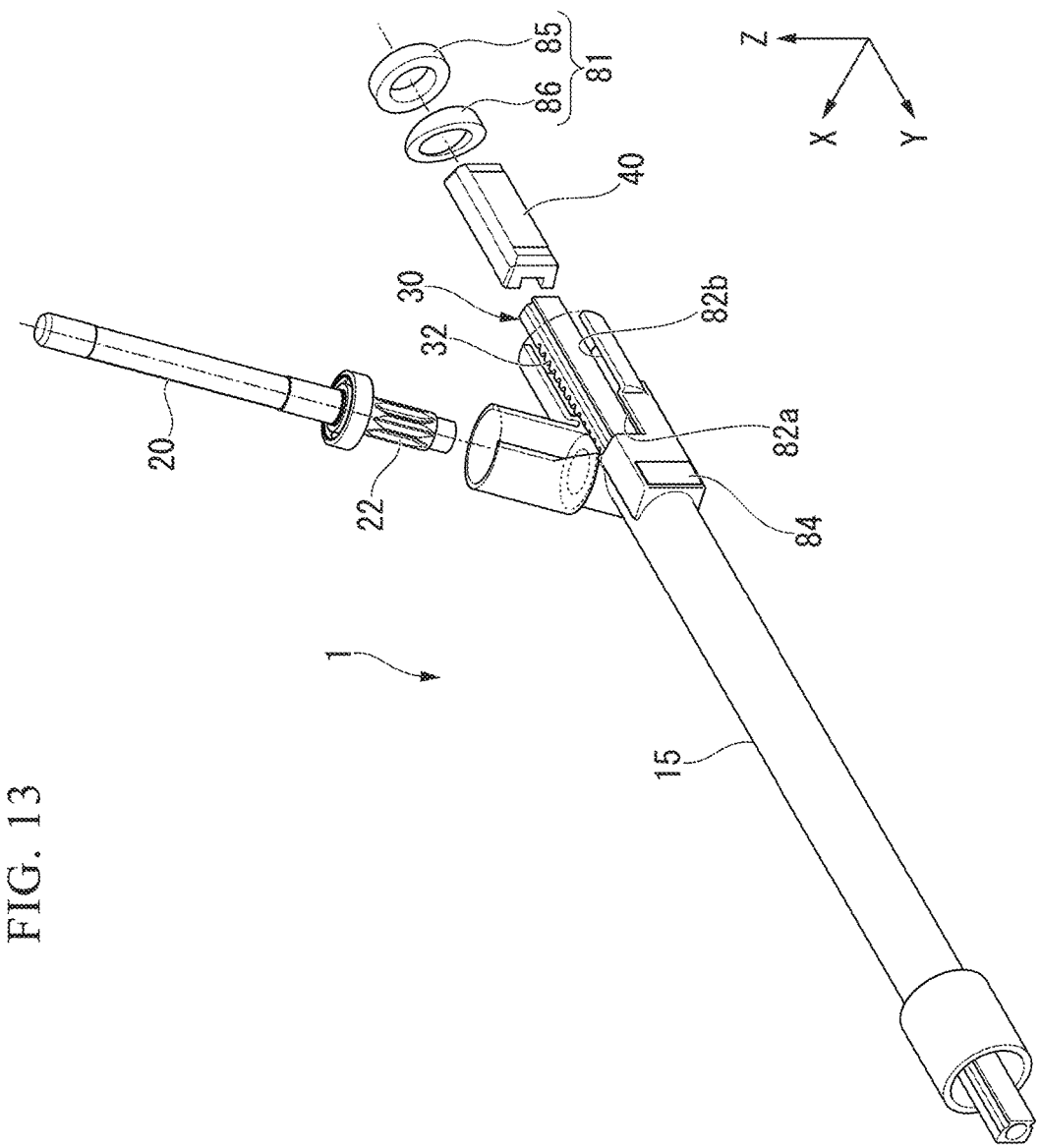
FIG. 13 is an exploded perspective view showing the steering apparatus 1 according to the fourth embodiment of the present invention.
Figure 14:
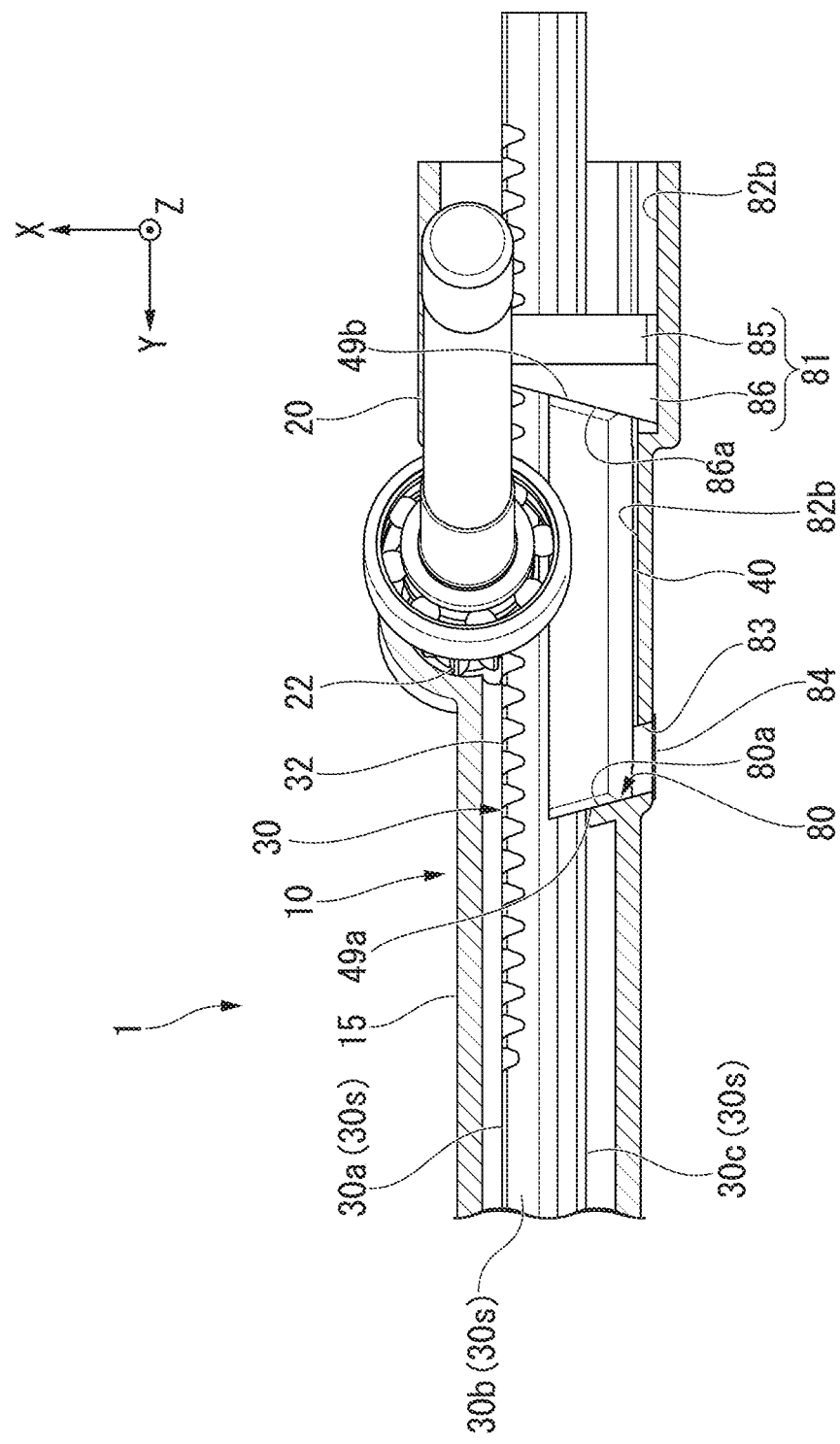
FIG. 14 is a partial cross-sectional view in a planar view showing a main part of the steering apparatus 1 according to the fourth embodiment of the present invention.

FIG. 12 is a perspective view showing a steering apparatus 1 according to a fourth embodiment of the present invention. FIG. 13 is an exploded perspective view showing the steering apparatus 1 according to the fourth embodiment of the present invention. FIG. 14 is a partial cross-sectional view in a planar view showing a main part of the steering apparatus 1 according to the fourth embodiment of the present invention. Note that, in FIG. 12 and FIG. 13, part of the rack cover 15 and the like are omitted. Further, in FIG. 14, upper half of the rack cover 15 and the like are omitted.

In the steering apparatus 1 of the fourth embodiment, the configuration of the rack and pinion apparatus 10 is different from those of the embodiments described above.

The rack and pinion apparatus 10 of the fourth embodiment includes a tilt part 80 that is provided on the rack cover 15, a push part 81 that pushes the support block 40 to the tilt part 80, and the like.

As shown in FIG. 12 and FIG. 13, a first accommodation part 82*a* that accommodates the support block 40 and a second accommodation part 82*b* that accommodates the push part 81 are formed on the rack cover 15. The first accommodation part 82*a* forms an accommodation space having a rectangular shape in a cross-sectional view that corresponds to the shape of the support block 40. Further, the second accommodation part 82*b* forms an accommodation space having a circular shape in a cross-sectional view that corresponds to the shape of the push part 81. The first accommodation part 82*a* is in communication with the second accommodation part 82*b* in the longitudinal direction of the rack bar 30.

As shown in FIG. 14, the tilt part 80 is formed integrally on the first accommodation part 82*a* of the rack cover 15. The tilt part 80 includes a tilt surface 80*a* that tilts so as to approach the rack bar 30 as being directed toward the rack bar 30. The tilt surface 80*a* tilts at a predetermined angle such that the position of the tilt surface 80*a* that is closer to the first side (+Y direction) in the longitudinal direction of the rack bar 30 is closer to the rear surface 30*c* of the rack bar 30. An opening part 83 used to form the tilt surface 80*a* is formed on the first accommodation part 82*a*, and the opening part 83 is closed by a cover member 84 (refer to FIG. 12 and FIG. 13).

The push part 81 pushes the support block 40 to the tilt part 80 in the longitudinal direction of the rack bar 30. The push part 81 includes a nut 85, a taper flange (second tilt part) 86, and the like. A female thread (not shown) is formed on the inner circumferential surface of the second accommodation part 82*b*, and a male thread (not shown) that is threaded with the female thread is formed on the outer circumference of the nut 85. The nut 85 has a ring shape into which the rack bar 30 can be inserted and has a configuration in which the nut 85 can be threaded into and/or release being threaded into the second accommodation part 82*b* in the longitudinal direction of the rack bar 30.

The taper flange 86 includes a tilt surface 86*a* that tilts so as to approach the rack bar 30 as being directed toward the rack bar 30. The tilt surface 86*a* tilts at a predetermined angle such that the position of the tilt surface 86*a* that is closer to the second side (−Y direction) in the longitudinal direction of the rack bar 30 is closer to the rear surface 30*c* of the rack bar 30. The taper flange 86 has a ring shape into which the rack bar 30 can be inserted and is arranged between the support block 40 and the nut 85. The taper flange 86 is preferably formed of, for example, a sintered body that is capable of absorbing and storing a lubricant in order to enhance slide properties with respect to the nut 85.

The support block 40 of the fourth embodiment has a configuration, as shown in FIG. 14, in which the support block 40 is interposed between the tilt part 80 and the taper flange 86 in the longitudinal direction of the rack bar 30. The support block 40 includes a first contact surface 49*a* that comes into contact with the tilt part 80 in a first side (+Y direction) in the longitudinal direction of the rack bar 30 and a second contact surface 49b that comes into contact with the taper flange 86 in a second side (−Y direction) in the longitudinal direction of the rack bar 30. The first contact surface 49a tilts such that the first contact surface 49a is capable of coming into plane contact with the tilt surface 80a of the tilt part 80. Further, the second contact surface 49b tilts such that the second contact surface 49b is capable of coming into plane contact with the tilt surface 86a of the taper flange 86. The first contact surface 49a and the second contact surface 49b can be formed by, for example, processing the cover body 48 shown in FIG. 6 and the like.

As described above, the fourth embodiment adopts a configuration that includes the rack cover 15 that covers the outer circumference of the rack bar 30, the tilt part 80 that is provided on the rack cover 15 and tilts such that the tilt part 80 approaches the rack bar 30 as the tilt part 80 is directed toward the rack bar 30, and the push part 81 that pushes the support block 40 to the tilt part 80 in the longitudinal direction of the rack bar 30. According to this configuration, when the nut 85 of the push part 81 is screwed, the support block 40 that is pushed to the tilt part 80 moves toward the pinion gear 22, and the rack bar 30 is pushed to the pinion gear 22. Accordingly, in the fourth embodiment, the preload of the rack gear 32 and the pinion gear 22 can be adjusted, and it is possible to prevent degradation of steering feel, gear rattle due to disturbance, or the like.

Further, the fourth embodiment adopts a configuration in which the support block 40 is interposed between the tilt part 80 and the taper flange 86 in the longitudinal direction of the rack bar 30. According to this configuration, even when the nut 85 of the push part 81 is screwed, the support block 40 is pushed out at both ends by the tilt surfaces 80a, 86a arranged in a tapered manner. Therefore, the support block 40 does not move in the longitudinal direction of the rack bar 30, and the preload of the rack gear 32 and the pinion gear 22 can be adjusted while holding the rack bar 30 at an appropriate position.

Further, in this configuration, as shown in FIG. 13, the support block 40 and the push part 81 can be assembled at one end in the longitudinal direction of the rack bar 30 with respect to the rack cover 15. Therefore, the configuration can be easily assembled compared to a conventional structure provided with a support yoke. Further, since there is no protrusion at other sections, the size of the apparatus can be reduced.

Further, the fourth embodiment can also adopt the following modified example.

Figure 15:
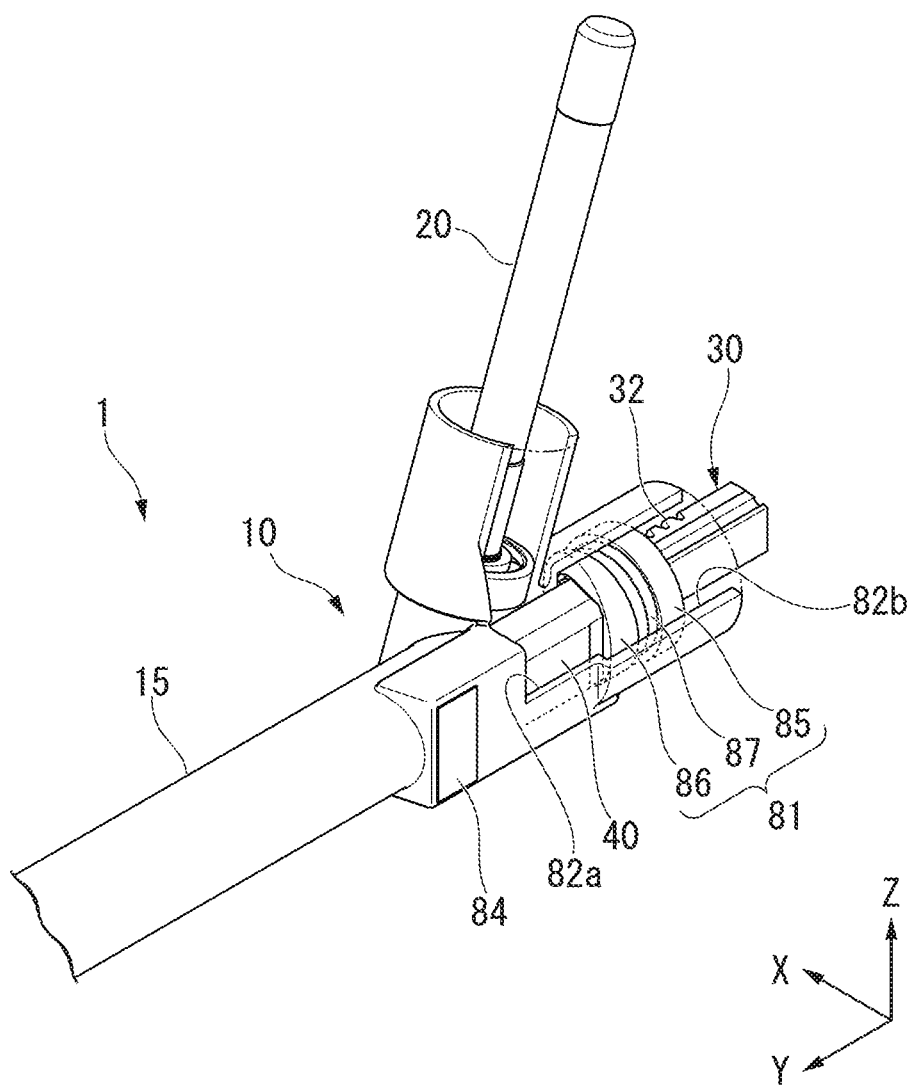
FIG. 15 is a perspective view showing a main part of a steering apparatus 1 according to a modified example of the fourth embodiment of the present invention.

FIG. 15 is a perspective view showing a main part of a steering apparatus 1 according to a modified example of the fourth embodiment of the present invention. Note that, in FIG. 15, part of the rack cover 15 is omitted.

In the steering apparatus 1, as shown in FIG. 15, the configuration of the push part 81 is different from those of the embodiments described above.

The push part 81 includes a compression spring 87 between the nut 85 and the taper flange 86. According to this configuration, even when the rack gear 32 and the pinion gear 22 are worn due to long-term use, the rack bar 30 can be pushed to the pinion gear 22 by elastic deformation of the compression spring 87 such that a gap due to wear is filled. Therefore, according to this configuration, even when the component is greatly worn, it is possible to push the rack gear 32 and the pinion gear 22 for a long period of time and prevent degradation of steering feel or gear rattle due to disturbance.

(Fifth Embodiment)

Next, a fifth embodiment of the present invention will be described. In the following description, configuration parts identical or similar to those of the embodiments described above are represented by the same reference numerals, and descriptions thereof will be simplified or omitted.

Figure 16:
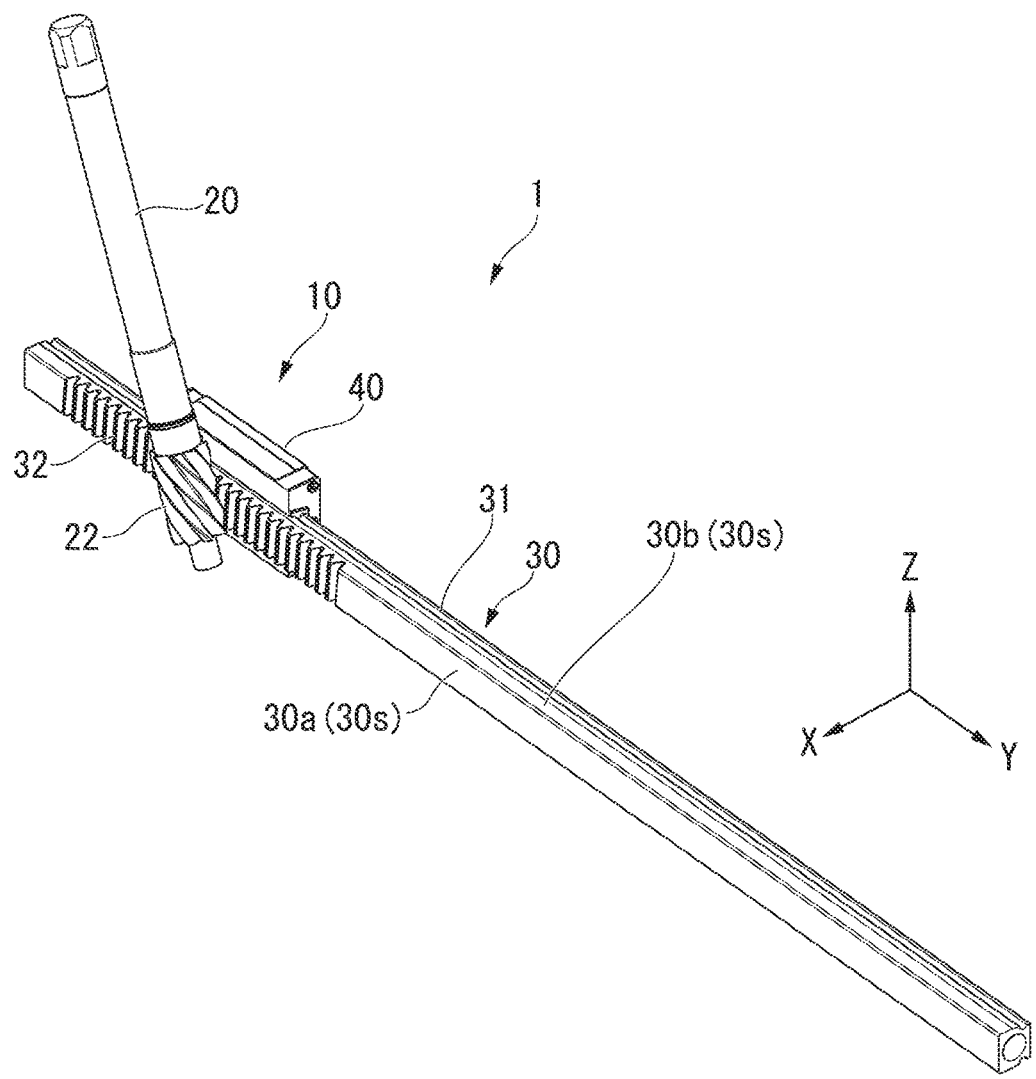
FIG. 16 is a perspective view showing a steering apparatus 1 according to a fifth embodiment of the present invention.
Figure 17:
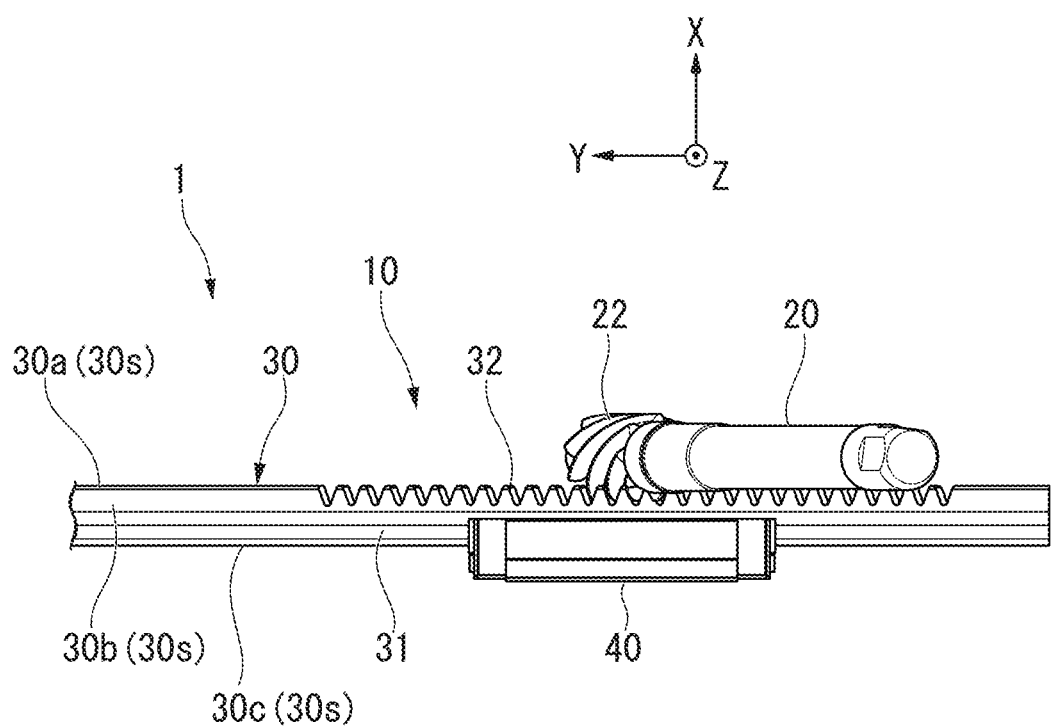
FIG. 17 is a plan view showing the steering apparatus 1 according to the fifth embodiment of the present invention.

FIG. 16 is a perspective view showing a steering apparatus 1 according to a fifth embodiment of the present invention. FIG. 17 is a plan view showing the steering apparatus 1 according to the fifth embodiment of the present invention. Note that, in FIG. 16 and FIG. 17, the rack cover 15 and the like are omitted.

In the steering apparatus 1 of the fifth embodiment, the configuration of the rack and pinion apparatus 10 is different from those of the embodiments described above.

The rack and pinion apparatus 10 of the fifth embodiment includes, as shown in FIG. 16 and FIG. 17, a pinion gear 22 formed of a helical tooth gear. The pinion gear 22 is formed obliquely with respect to the pinion shaft 20. The tooth width of the pinion gear 22 is formed so as to be longer than the tooth width of the rack gear 32. It is possible to arbitrarily set the number of teeth, dimension, accuracy, and the like of the pinion gear 22.

Figure 18:
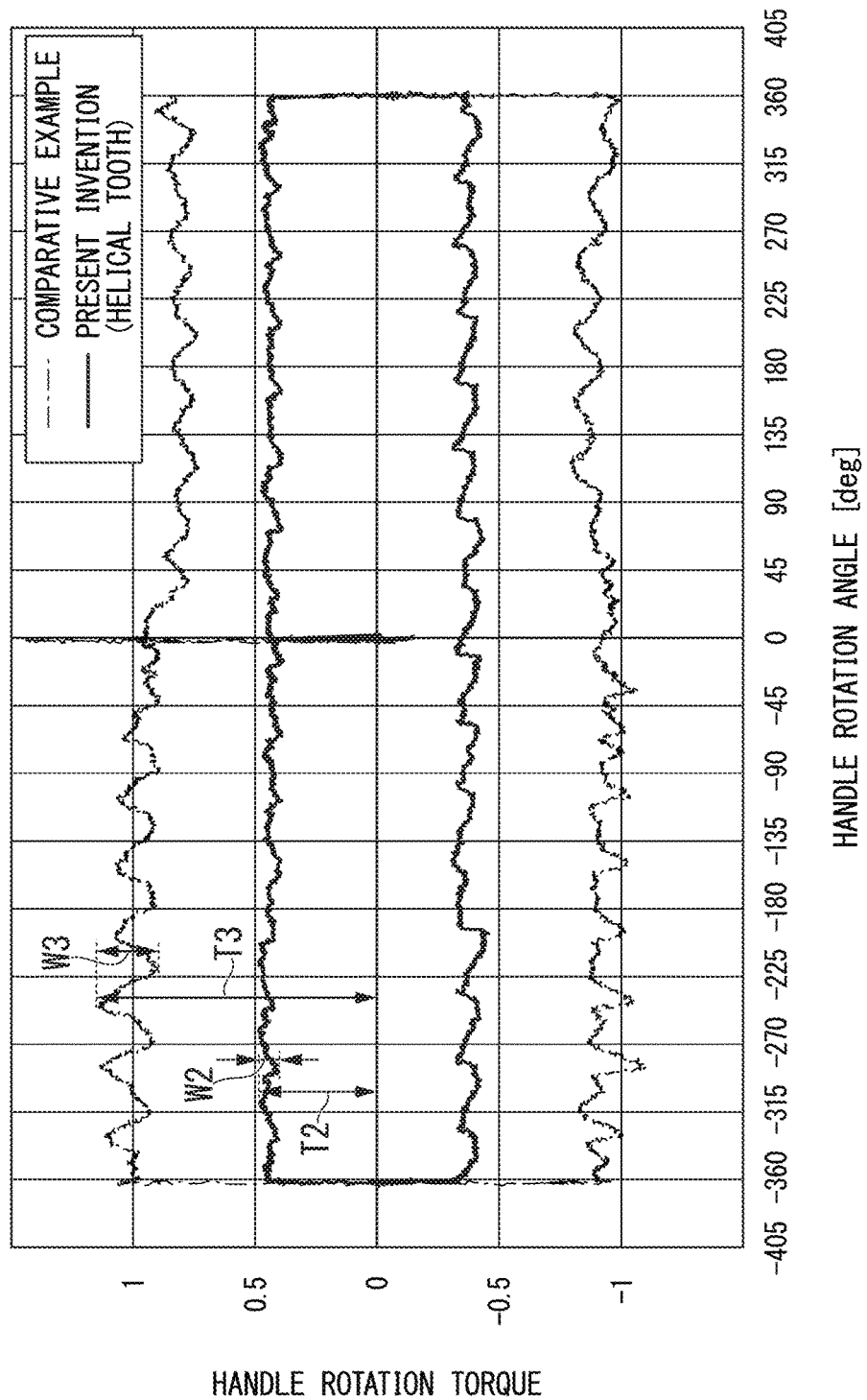
FIG. 18 shows an experimental result in which a handle rotation torque of the steering apparatus 1 (helical tooth) according to the fifth embodiment of the present invention is compared with a handle rotation torque of a commercially available steering apparatus according to a comparative example.
Figure 19:
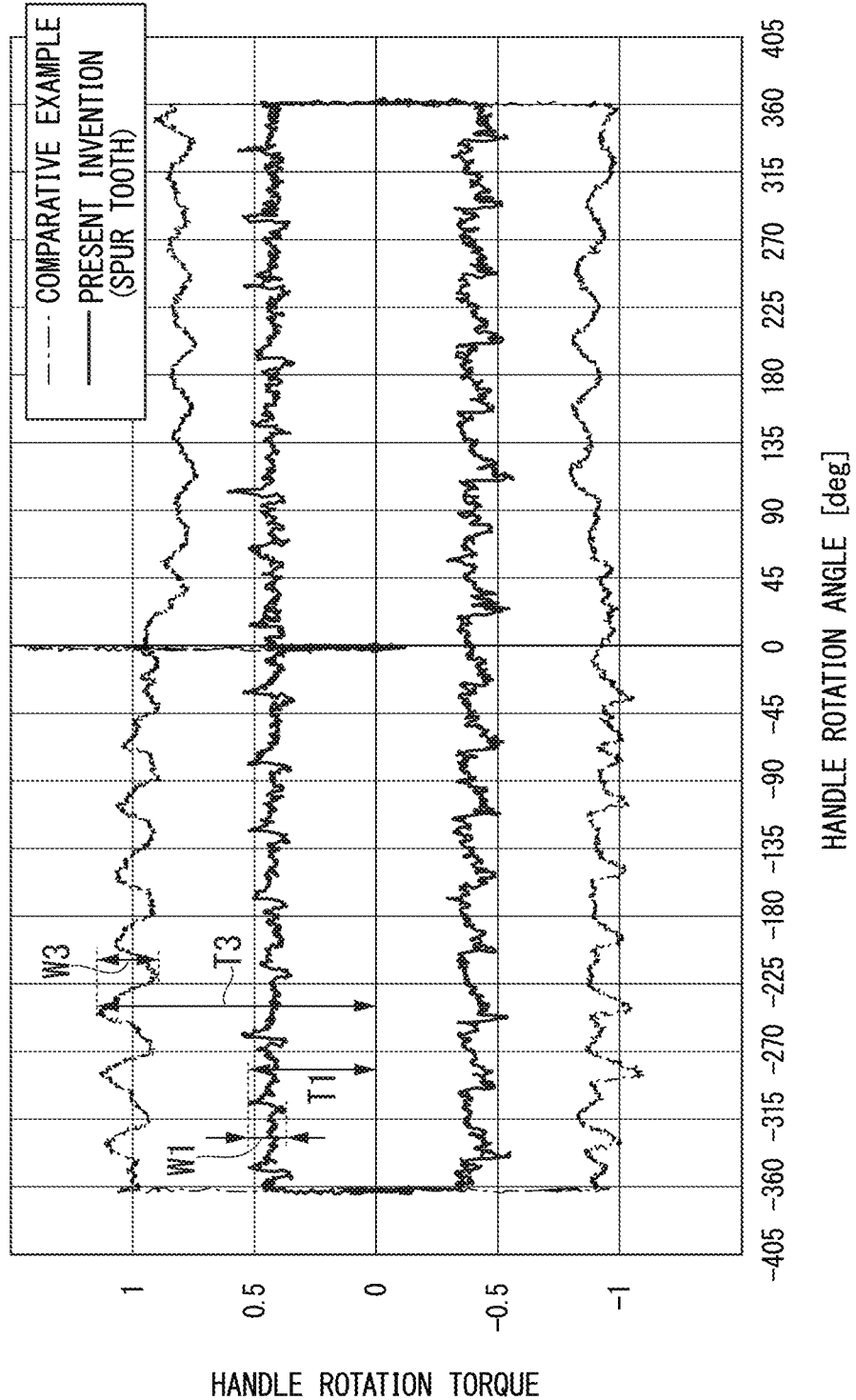
FIG. 19 shows an experimental result in which a handle rotation torque of the steering apparatus 1 (spur tooth) according to the first to fourth embodiment of the present invention is compared with a handle rotation torque of a commercially available steering apparatus according to a comparative example.

FIG. 18 shows an experimental result in which a handle rotation torque of the steering apparatus 1 (helical tooth) according to the fifth embodiment of the present invention is compared with a handle rotation torque of a conventional steering apparatus according to a comparative example. Further, FIG. 19 shows an experimental result in which a handle rotation torque of the steering apparatus 1 (spur tooth) according to the first to fourth embodiment of the present invention is compared with a handle rotation torque of a commercially available steering apparatus according to a comparative example. In FIG. 18 and FIG. 19, the vertical axis represents a handle rotation torque, and the horizontal axis represents a handle rotation angle. Note that, the commercially available steering apparatus as the comparative example is an apparatus having a known configuration that is provided with a support yoke on the rear surface side (−X direction) of the rack cover 15 instead of the support block 40.

First, as shown in FIG. 19, when a torque T1 of the steering apparatus 1 (spur tooth) according to the first to fourth embodiment is compared with a torque T3 of the steering apparatus according to the comparative example, it is found that there is a relationship of T1<T3. Further, when a torque variation W1 of the steering apparatus 1 (spur tooth) according to the first to fourth embodiment is compared with a torque variation W3 of the steering apparatus according to the comparative example, it is found that there is a relationship of W1<W3.

Next, as shown in FIG. 18, when a torque T2 of the steering apparatus 1 (helical tooth) according to the fifth embodiment is compared with the torque T3 of the steering apparatus according to the comparative example, it is found that there is a relationship of T2<T3. Further, in consideration of FIG. 19, it is found that there is a relationship of T2<T1<T3. Further, when a torque variation W2 of the steering apparatus 1 (helical tooth) according to the fifth embodiment is compared with the torque variation W3 of the steering apparatus according to the comparative example, it is found that there is a relationship of W2<W3. Further, in consideration of FIG. 19, it is found that there is a relationship of W2<W1<W3.

As described above, in the fifth embodiment, the pinion gear 22 is configured by a helical tooth gear. According to this configuration, as shown in FIG. 18 and FIG. 19, it is possible to keep the torque and torque variation small, and it is possible to improve the steering feel of the steering apparatus 1.

(Sixth Embodiment)

Next, a sixth embodiment of the present invention will be described. In the following description, configuration parts identical or similar to those of the embodiments described above are represented by the same reference numerals, and a description thereof will be simplified or omitted.

Figure 20:
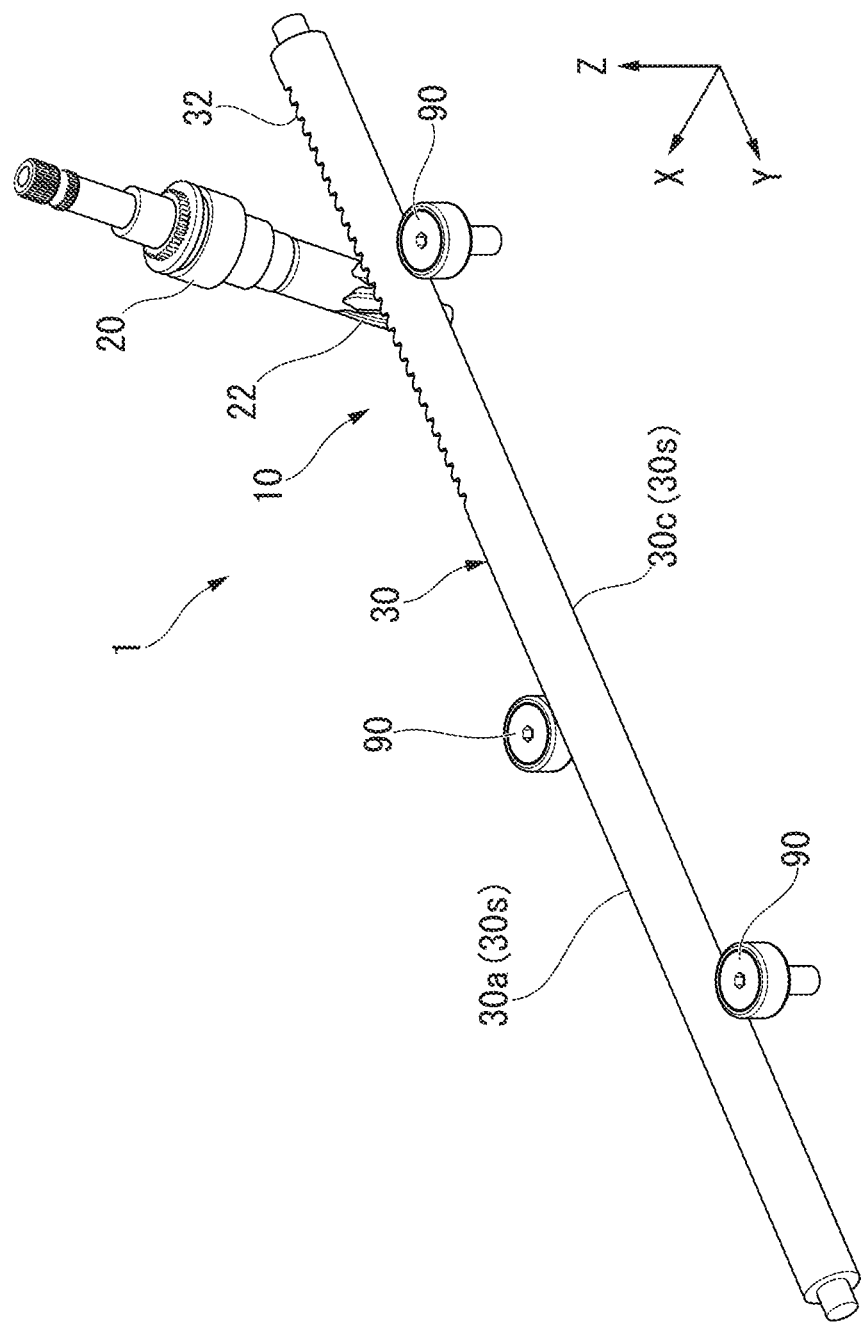
FIG. 20 is a perspective view showing a steering apparatus 1 according to a sixth embodiment of the present invention.

FIG. 20 is a perspective view showing a steering apparatus 1 according to a sixth embodiment of the present invention. Note that, in FIG. 20, the rack cover 15 and the like are omitted.

In the steering apparatus 1 of the sixth embodiment, the configuration of the rack and pinion apparatus 10 is different from those of the embodiments described above.

The rack and pinion apparatus 10 of the sixth embodiment includes a cam member 90 as a support part of the rack bar 30.

A plurality of the cam members 90 are arranged at intervals in the longitudinal direction of the rack bar 30. In FIG. 20, the cam members 90 are alternately arranged at total three positions which are a position on the rear surface 30c side of the rack bar 30 that is opposed to the pinion gear 22, a position on the front surface 30a side of the rack bar 30, and a position on the rear surface 30c side of the rack bar 30 that is away from the pinion gear 22.

The cam member 90 is a bearing with a shaft having a needle bearing installed inside the cam member and functions as a guide roller. An eccentric cam follower can be preferably used, for example, as the cam member 90. The cam member 90 has a configuration in which the cam member 90 comes into contact rotatably with the outer circumferential surface 30s of the rack bar 30 as a support surface in the longitudinal direction of the rack bar 30.

As described above, the sixth embodiment adopts a configuration that includes, as a support part, a plurality of cam members 90 that are arranged at intervals in the longitudinal direction of the rack bar 30 and comes into contact rotatably with the outer circumferential surface 30s in the longitudinal direction of the rack bar 30. According to this configuration, the cam member 90 is arranged at a plurality of locations, and thereby the cam member 90 is subject to bending due to a buckling load input to the rack gear 32. Therefore, the cross-sectional area of the rack bar 30 can be reduced compared to a conventional one, and the weight of the rack bar can be reduced. Further, according to this configuration, the rack bar 30 and the cam member 90 come into contact in a rolling manner with each other, and therefore it is possible to reduce the friction when the rack bar 30 moves in the longitudinal direction. Further, when the eccentric cam follower is adopted as the cam member 90, the preload on the rack bar 30 can be adjusted, and it is possible to reduce rattling between the rack gear 32 and the pinion gear 22 and to prevent occurrence of gear rattle.

Further, the sixth embodiment can also adopt the following modified example.

Figure 21:
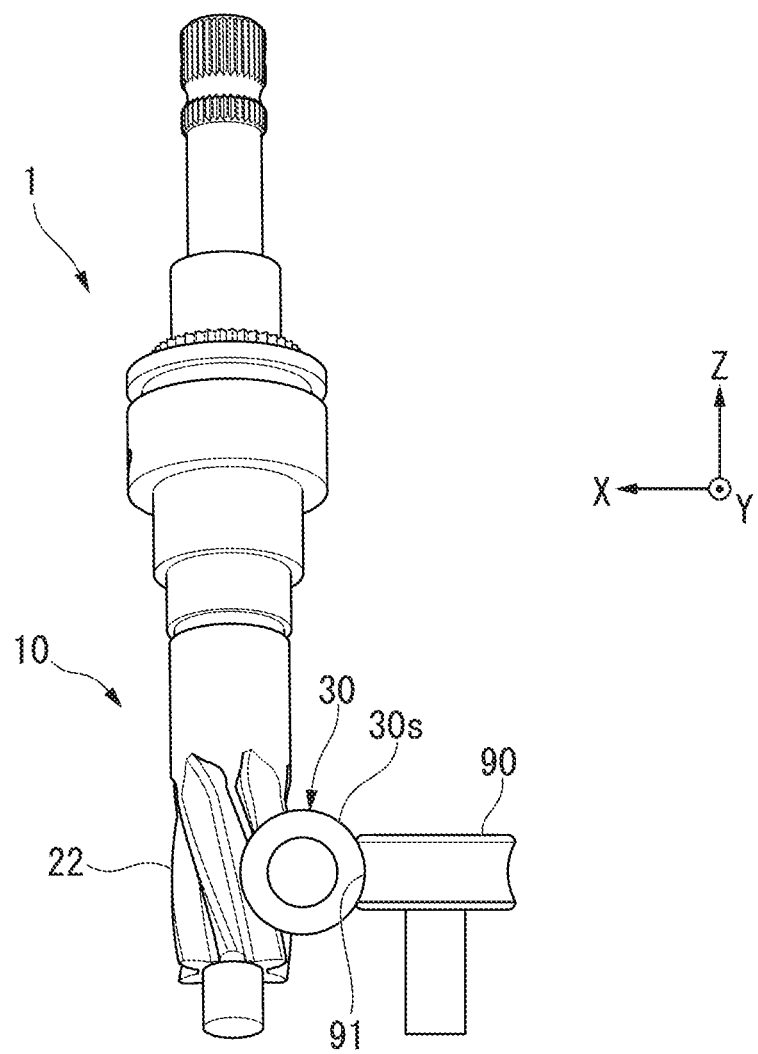
FIG. 21 is a lateral view showing a main part of a steering apparatus 1 according to a modified example of the sixth embodiment of the present invention.

FIG. 21 is a lateral view showing a main part of a steering apparatus 1 according to a modified example of the sixth embodiment of the present invention. Note that, in FIG. 21, the rack cover 15 is omitted.

As shown in FIG. 21, the steering apparatus 1 has a curved surface 91 having an arc shape in which the outer circumferential surface of the cam member 90 is along the shape of the outer circumferential surface 30s of the rack bar 30. According to this configuration, the outer circumferential surface of the cam member 90 has a reversed R shape along the outer diameter of the rack bar 30, and therefore it is possible to relax the stress from the rack bar 30.

Figure 22:
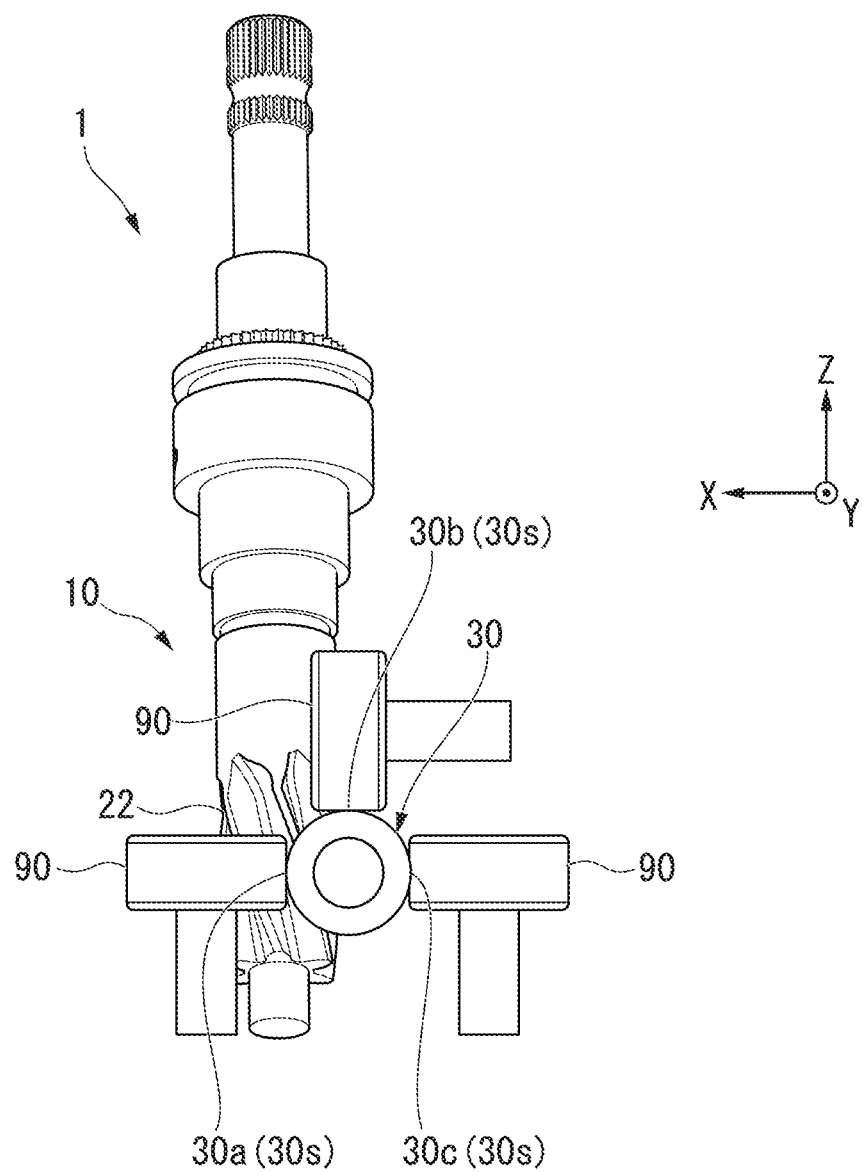
FIG. 22 is a lateral view showing a main part of a steering apparatus 1 according to a modified example of the sixth embodiment of the present invention.

FIG. 22 is a lateral view showing a main part of the steering apparatus 1 according to a modified example of the sixth embodiment of the present invention. Note that, in FIG. 22, the rack cover 15 is omitted.

As shown in FIG. 22, in the steering apparatus 1, a plurality of cam members 90 come into contact at a different angle respectively with the outer circumferential surface 30s of the rack bar 30. In FIG. 22, a plurality of cam members 90 come into contact at three directions which is the front surface 30a, the lateral surface 30b, and the rear surface 30c of the rack bar 30. The cam member 90 is adopted as the support part, and thereby it is possible to reduce the space compared to the support block 40 described above. Therefore, as shown in FIG. 22, based on the properties of the buckling load input to the rack bar 30 and the like, it is possible to arbitrarily set the arrangement of the cam member 90.

A variety of shapes and combination of the configuration members shown in the embodiments described above and the like are examples, and various changes can be made based on design requests and the like without departing from the scope of the present invention.

A case where a plurality of balls 50 are interposed between the rack bar 30 and the support block 40 is described; however embodiments are not limited thereto. A roller may be used instead of the ball 50. In this case, a ball roll surface is formed instead of the ball roll groove 31.

The ball 50 or the roller may not be used, and the rack bar 30 and the support block 40 may slide (sliding support) with respect to each other.

The rack bar 30 is not limited to a case where the cross-section is formed in a substantially rectangular shape. The rack bar 30 may have a column shape, a cylindrical shape, a polygonal column shape, and the like. A radial bearing (journal bearing) that allows the rack bar 30 to move in the right-to-left direction may be used instead of the support block 40.

A case where the rack bar 30 is supported by one support block 40 is described; however, embodiments are not limited thereto. A plurality of support blocks 40 may be arranged.

Further, the rack bar 30 may be supported by using a plurality of bearings and the like instead of the support block 40.

A case where the support block 40 supports the lateral surface 30b and the rear surface 30c of the rack bar 30 is described; however, embodiments are not limited thereto. The support block 40 may support the front surface 30a of the rack bar 30. The support block 40 may support the front surface 30a and the rear surface 30c. Alternatively, the support block 40 may support only the lateral surface 30b.

Further, a linear guide is used for the support block 40. However, similar advantages can be obtained even when a ball spline and the like are used.

In any of support methods, it is necessary that the movement (displacement) in the X direction of the rack bar 30 is prevented and an apparent rigidity in the X direction of the rack bar 30 is enhanced.

A support yoke may be provided on the rear surface side (−X direction) of the rack cover 15. Thereby, the engagement between the pinion gear 22 and the rack gear 32 can be easily adjusted (backlash adjustment).

The embodiments are not limited to the case where the rack and pinion apparatus 10 is used for the steering apparatus 1 of the vehicle A. The rack and pinion apparatus 10 can be used for a steering apparatus of a ship, an airplane, and the like.

INDUSTRIAL APPLICABILITY

According to the rotation-linear motion conversion apparatus and the steering apparatus described above, it is possible to reduce the weight of the rack bar. Accordingly, it is possible to contribute to reducing the weight of the vehicle.

According to the rotation-linear motion conversion apparatus and the steering apparatus described above, it is possible to smoothen the feel transmitted to the steering wheel at the time of traveling.

DESCRIPTION OF THE REFERENCE SYMBOLS 1 steering apparatus
2a ball roll groove (support surface)
3 steering shaft
5 link member
10 rack and pinion apparatus (rotation-linear motion conversion apparatus)
20 pinion shaft
22 pinion gear
30 rack bar
30a front surface
31 ball roll groove (support surface)
32 rack gear
32h tooth width
32f pitch surface
40 support block (support part)
50 ball (rolling element)
60 second rack gear
61 second pinion gear
62 rotation drive device
70 ball thread groove
71 ball nut
72 rotation drive device
80 tilt part
81 push part
86 taper flange (second tilt part)
90 cam member
S steering wheel
T tire (wheel)

The invention claimed is:

1. A rotation-linear motion conversion apparatus comprising:
a pinion shaft in which a pinion gear is formed;
a rack bar in which a rack gear that engages with the pinion gear and a support surface along a longitudinal direction are formed;
a support part that supports the rack bar movably along the support surface, and
a plurality of rolling elements that are arranged between the support part and the rack bar and that are configured to roll on the support surface,
wherein a cross-section of the rack bar, in a direction perpendicular to a longitudinal direction of the rack bar, has a substantially rectangular shape,
wherein the rack bar includes a front surface having the rack gear, a rear surface opposite to the front surface, and lateral surfaces connecting the front surface and the rear surface, the support surface being a roll groove which is formed on each of the lateral surfaces connecting the front surface and the rear surface and on which the plurality of rolling elements roll,
wherein the support part is formed in a saddle shape that bridges the rack bar,
wherein the support part comprises:
a lateral surface that is opposed to the lateral surface of the rack bar; and
a surface that is opposed to the rear surface of the rack bar and that is substantially orthogonal to the lateral surface of the support part,
wherein the support part includes a load rolling element roll groove that is opposed to the roll groove of the rack bar, and
wherein the support part prevents the rack bar, via the plurality of rolling elements, from relatively moving in a direction perpendicular to a surface on which the rack gear is formed.

2. The rotation-linear motion conversion apparatus according to claim 1, wherein
the pinion gear and the rack gear are each formed as a spur gear, a tooth width direction of the rack gear crosses with respect to a width direction of the rack bar, and
a pitch surface of the rack gear is tilted in a thickness direction of the rack bar.

3. The rotation-linear motion conversion apparatus according to claim 1, comprising:
a second rack gear that is formed on the rack bar;
a second pinion gear that engages with the second rack gear; and
a rotation drive device that rotates the second pinion gear.

4. The rotation-linear motion conversion apparatus according to claim 1, comprising:
a spiral ball thread groove that is formed on the rack bar;
a ball nut that engages with the ball thread groove; and
a rotation drive device that rotates the ball nut.

5. The rotation-linear motion conversion apparatus according to claim 1, comprising:
a rack cover that covers the outer circumference of the rack bar;
a tilt part that is provided on the rack cover and tilts such that the tilt part approaches the rack bar as the tilt part is directed toward the rack bar; and
a push part that pushes the support part to the tilt part in a longitudinal direction of the rack bar.

6. The rotation-linear motion conversion apparatus according to claim 5, wherein
the push part includes a second tilt part that tilts such that the second tilt part approaches the rack bar while the second tilt part is opposed to the rack bar, and
the support part is interposed between the tilt part and the second tilt part in the longitudinal direction of the rack bar.

7. A steering apparatus comprising:
a steering shaft that is connected to a steering wheel;
a link member that is connected to a wheel; and
a rotation-linear motion conversion apparatus that converts a rotation of the steering shaft into a linear motion and linearly moves the link member, wherein
a rotation-linear motion conversion apparatus according to claim 1 is used as the rotation-linear motion conversion apparatus.

* * * * *